United States Patent [19]
Saito et al.

[11] Patent Number: 5,377,178
[45] Date of Patent: Dec. 27, 1994

[54] DATA RECORDING/REPRODUCING METHOD AND APPARATUS USING A RECORDING MEDIUM HAVING CLOCK MARKS RECORDED IN A WOBBLED TRACK FOR READ/WRITE SYNCHRONIZATION

[75] Inventors: Atsushi Saito, Ichikawa; Takeshi Maeda, Kokubunji; Takeshi Nakao, Sagamihara; Kiyoshi Matsumoto, Kokubunji; Atsushi Saito, Hino; Hiroyuki Minemura; Tetsuya Fushimi, both of Hitachi, all of Japan

[73] Assignee: Hitachi, Ltd., Tokyo, Japan

[21] Appl. No.: 960,506

[22] Filed: Oct. 13, 1992

Related U.S. Application Data
[63] Continuation-in-part of Ser. No. 838,695, Feb. 21, 1992.

[30] Foreign Application Priority Data
Oct. 11, 1991 [JP] Japan .................................. 3-263560
Mar. 19, 1992 [JP] Japan .................................. 4-063073

[51] Int. Cl.$^5$ .............................................. G11B 7/00
[52] U.S. Cl. ...................................... 369/124; 369/278; 369/275.3; 369/279; 369/59; 360/40; 360/48; 360/49; 360/77.08
[58] Field of Search ............... 369/124, 109, 124, 111, 369/275.3, 277, 278, 48, 47, 44.26, 44.34, 59, 279; 360/77.08, 32, 33.1, 48, 49, 40

[56] References Cited
U.S. PATENT DOCUMENTS
| | | | |
|---|---|---|---|
| 5,073,880 | 12/1991 | Maeda et al. | 369/32 |
| 5,161,136 | 11/1992 | Segawa | 369/44.34 |
| 5,163,035 | 11/1992 | Horikiri | 369/47 |
| 5,193,034 | 3/1993 | Tsuyoshi et al. | 360/77.08 |
| 5,210,738 | 5/1993 | Iwata et al. | 369/275.1 |
| 5,218,589 | 6/1993 | Aoki | 369/44.34 |
| 5,233,589 | 8/1993 | Saito et al. | 369/48 |

FOREIGN PATENT DOCUMENTS
60-167129 8/1985 Japan .
62-254514 11/1987 Japan .
2-183471 7/1990 Japan .

Primary Examiner—Paul M. Dzierzynski
Assistant Examiner—Kim-Kwok Chu
Attorney, Agent, or Firm—Fay, Sharpe, Beall, Fagan, Minnich & McKee

[57] ABSTRACT

A data recording/reproduction method and apparatus uses an optical disk equipped with wobbling track guide grooves disposed in a track scanning direction and minutely wobbled. The apparatus uses a circuit for detecting and correcting displacement of an optical spot position from the wobbling track, and a system for allowing data to correspond to front and rear edges of recording pits as a recording system, and includes a circuit for independently handling reproduction pulses obtained from reproduction signals of the recording pits on the front and rear edge sides and for generating reproduction clocks. A circuit resynthesizes the two series of reproduction pulse trains by a specific pattern portion in the data. Another optical disk apparatus divides each track into zones, and switches a rate of revolution each zone to attain a substantially equal linear velocity. A servo signal reproduction clock generation circuit and a data signal recording/reproduction clock generation circuit are disposed separately. The latter changes a frequency division ratio in accordance with the zones so that a clock having a predetermined frequency can be generated even when the rate of revolution changes.

38 Claims, 20 Drawing Sheets

F I G. 14A
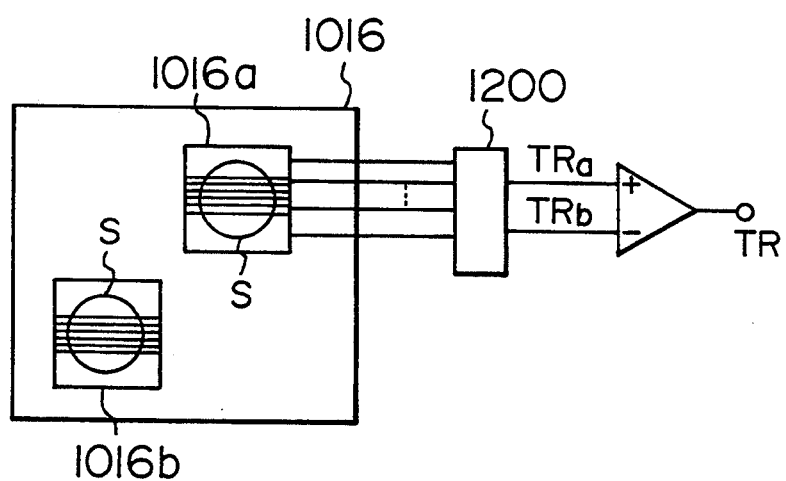
F I G. 14B
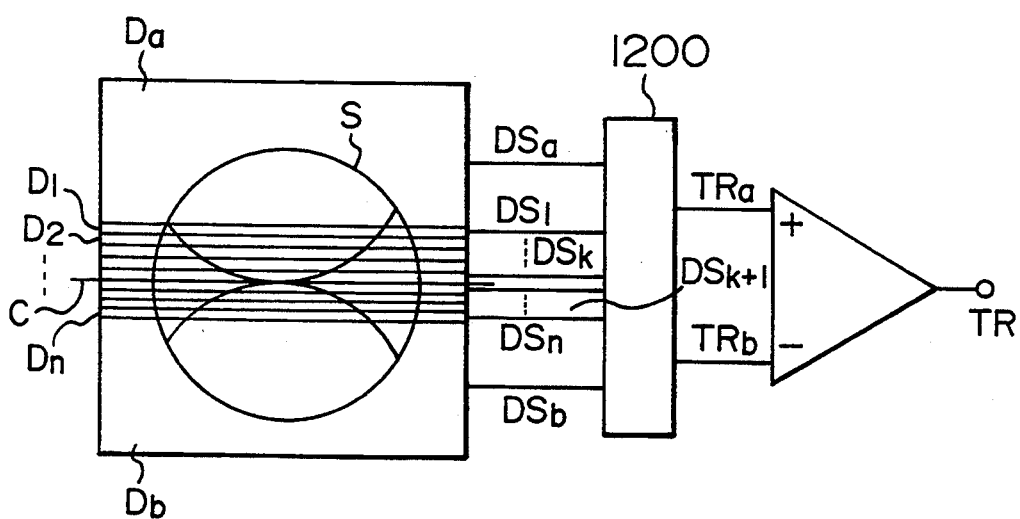

F I G. 17
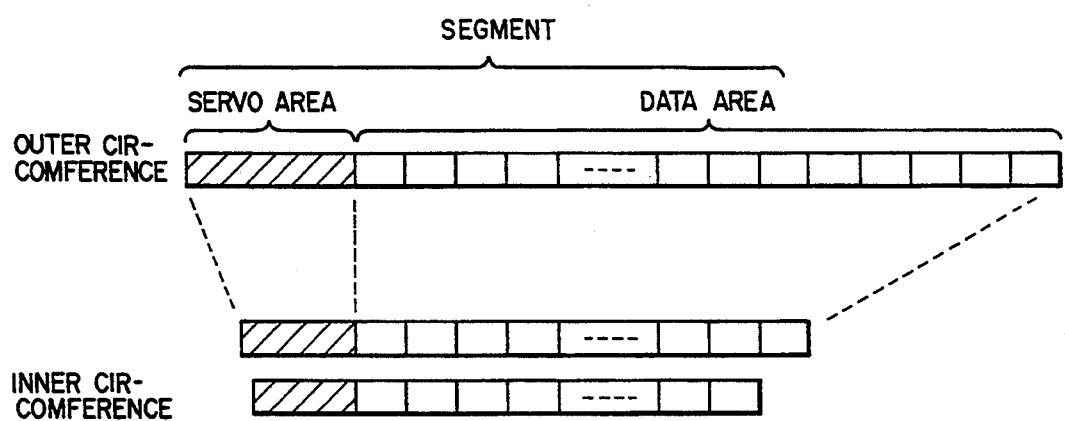
F I G. 18
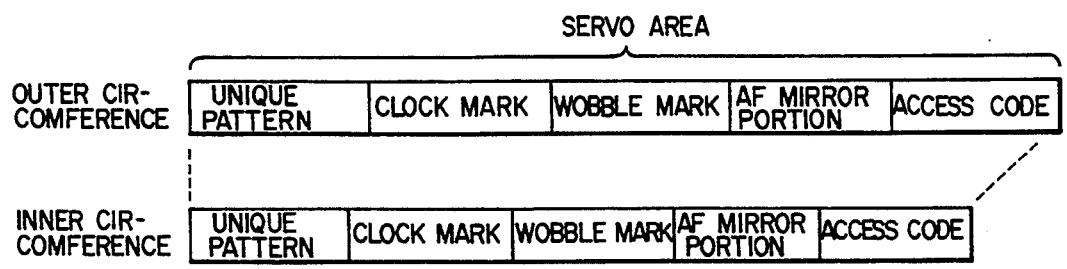

DATA RECORDING/REPRODUCING METHOD AND APPARATUS USING A RECORDING MEDIUM HAVING CLOCK MARKS RECORDED IN A WOBBLED TRACK FOR READ/WRITE SYNCHRONIZATION

This is a continuation-in-part of Ser. No. 07/838,695, filed on Feb. 21, 1992, the disclosure of which is hereby incorporated by reference.

BACKGROUND OF THE INVENTION

This invention relates to a data processing apparatus and more particularly, it relates to a data recording/reproduction apparatus for recording and reproducing data in a high density and for effecting stable tracking. Furthermore, the present invention relates to an optical disk apparatus of a so-called "sample servo system" which effects recording/reproduction of signals by detecting clock marks, etc., disposed intermittently on tracks of an optical disk and to a recording/reproduction method for such an apparatus, and more particularly to a format structure and a recording/reproduction method suitable for increasing a storage capacity.

Various techniques have been proposed to accurately track data during high density recording and reproduction of data in an optical data recording/reproduction apparatus.

JP-A-2-183471 (corresponding to U.S. Ser. No. 07/460,370 filed on Jan. 3, 1990 now U.S. Pat. No. 5,233,589) proposes an optical data processing apparatus for recording and reproducing data in such a manner that a specific code word, such as "1", corresponds to front and rear edges of a recording pit, as an example of high density recording. To correct the change of edge positions of the pit caused at the time of recording data, or in other words, the change of a recording length from a normal length due to fluctuation of recording power and a recording pulse width, fluctuation of sensitivity of the recording medium, fluctuation of an intensity distribution of an optical spot for recording/reproduction, and so forth, this technique generates reproduction clocks from the front edge and the rear edge independently of each other, obtains a series of reproduction pulses and a series of reproduction clocks from the front edges and another series of reproduction pulses and another series of reproduction clocks from the rear edges, stores them in a memory in such a manner that the interval between the front and rear edges becomes a normal pulse gap, and effects data reproduction by an identification clock.

On the other hand, JP-A-60-167129 describes a data processing unit as an example of the technique for accurately tracking data. The optical disk medium described in this reference has track guide grooves which are wobbled (displaced) in a track scanning direction. When such an optical disk medium is employed, a track offset distance can always be detected even at the time of tracking or tracing the tracks, and can be corrected.

Another example of high density recording is known which uses a rotary recording medium on which a large number of tracks are disposed either concentrically or spirally at a constant pitch, and data are recorded on these tracks. To reproduce, erase or record data on an optical disk which is an example of the rotary recording medium, so-called "sample servo" has been proposed as a method for focusing control for keeping a focus of an optical spot on a recording surface of the optical disk, tracking control for tracking the optical spot on the track, or access control for selecting a track to which data are to be recorded. In the sample servo system, servo areas for detecting the servo signals at every predetermined angle of the optical disk are disposed and data areas for recording the data are disposed between the servo areas in the case of B-type format described in the 5-inch format JIS (JIS-X6271). A clock mark for generating a clock signal is disposed in each servo area and the off-focus signal, the offtrack signal or the optical spot moving signal for access is detected on the basis of the clock signal obtained from the clock mark to effect focus control, tracking control or access control. The same clock is also used for recording and reproducing the data.

The offtrack signal is generated from the difference between the reflected light powers when the optical spot passes through two wobble marks so disposed as to oppose each other while sandwiching the track center between them. Therefore there is an advantage that a detection optical system can be simplified. Since the servo area and the data area are separated from each other and signal detection is carried out on a time division basis, detection of the servo signal and recording/reproduction of the data can be carried out by the use of a single clock synchronized with the clock mark without mutual interference.

A set of the servo area and the data area is referred to as a "segment". Several segments together form a sector. The address of the track is recorded at the leading part of the sector, and this part is referred to as a "header". The servo area, the data area or the segment comprised of them and the leading part of the sector are linearly aligned in the radial direction. Similarly, the clock marks in the servo areas are aligned linearly in the radial direction. Since the optical disk rotates at a constant angular velocity, the clock marks appear with an equal time interval. Since the disk rotates at a constant angular velocity, this is referred to as a "CAV (Constant Angular Velocity) system".

In contrast to this CAV system, a system referred to as a "CLV (Constant Linear Velocity) system" is known. This system changes the number of revolutions of the disk depending on a track position so that the linear velocity becomes always constant. This system is used, for example, in a DAD (Digital Audio Disk). According to the CLV system, data can be written continuously at the same pitch from the inner periphery, for example, and a storage capacity can be increased. Since the linear velocity is constant in this system, a burden to the recording/reproduction system can be reduced, and this system can be used for a medium having a small recording power margin.

Reference may be further made to U.S. Ser. No. 07/551,808 filed on Jul. 12, 1990, now U.S. Pat. No. 5,193,034, which discloses a magnetic disk apparatus of a constant recording type, having a plurality of disks. At least one of the disk surfaces is a servo face divided into a plurality of zones. Servo data areas and clock data areas are alternately arranged on the servo face in its circumferential direction and the number of magnetic transitions representative of clocks in the clock data areas is different from each of the divided zones.

SUMMARY OF THE INVENTION

Although various methods for individually solving the problems encountered in high density recording and in accurately tracing tracks have been proposed as described above, no data processing apparatus capable of solving them simultaneously has yet been available.

Furthermore, when a data processing apparatus is constituted by combining the known techniques described above together, it has been found that the following new problems develop. In a data processing apparatus using a recording medium having wobbling tracks, an optical spot position for recording and reproducing data pits scans generally a mean position with respect to wobbling or displacement of the wobbling track, and therefore the optical spot looks as if it is wobbling when viewed from the track side. Therefore, since the distance between the data pit and the track guide groove changes in a wobbling cycle, the relative distance relationship between the data pit and the wobbling track guide groove .changes at the wobbling frequency. For this reason, the amplitude and phase of a reproduction signal for the data pit exhibit a similar change. When the pit edge recording system is employed for a medium equipped with such wobbling tracks, the pit length unavoidably changes in such a manner as to correspond to the wobbling frequency, and it becomes difficult to reproduce an accurate edge position. In other words, stable optical spot positional control (tracking) and high density recording cannot be accomplished simultaneously.

It is therefore an object of the present invention to provide a data recording/reproduction method and apparatus capable of accomplishing stable optical spot control and high density recording/reproduction.

It is another object of the present invention to provide a data recording/reproduction apparatus capable of accurately reproducing signals without being affected by a shift of a pit edge position.

From one aspect of the present invention, the data recording/reproduction apparatus for accomplishing the objects described above is constituted by effecting pit edge recording on a recording medium having wobbling tracks. In an embodiment of the present invention, data pits are recorded on, or between, track guide grooves by the use of wobbling tracks in a track scanning direction so as to stabilize an optical spot position, and tracking control is carried out by setting a wobbling frequency of the wobbling tracks to a frequency higher than a control frequency of the optical spot. To cope with a change of pit edge positions at the time of recording that occurs when data recorded in a high density are reproduced, reproduction pulses detected from the front and rear edges of the data pit are inputted to separate reproduction clock generation systems, respectively, and after reproduction clocks are generated independently, reproduction pulse trains from the front and rear edges that are processed independently are again combined into a normal data string on the basis of data intervals such as synchronizing patterns, demodulation start patterns, and so forth, because, to generate the reproduction clocks from the reproduction pulse trains, a single reproduction clock generation system cannot follow a quick change of the front edge pulse and the rear edge pulse. Preferably, a PLL (Phase Locked Loop) is used as the reproduction clock generation means described above, and its response band is set to be higher than the wobbling frequency.

Preferably, offset correction due to wobbling is similarly applied to a direction of the depth of tracks, as well. In this case, if wobbling in the direction of the depth becomes alternate for each adjacent pair of tracks, any influences of thermal interference between the adjacent tracks can be reduced.

More definitely, even while the optical spot scans on the wobbling tracks, the wobbling tracks that are minutely wobbled and disposed in the track scanning direction always detect the track offset distance and correct the offset. Similarly, an off-focus distance is always detected by tracks minutely wobbled in the track depth-wise direction, and this off-focus is corrected. When the means described above is used, a recording pit length is modulated by the wobbling frequency and the pit length appears stretched or contracted from the aspect of recording and reproduction. However, this influence can be eliminated by inputting the reproduction pulses corresponding to the front and rear edges of the pit to independent reproduction clock generation systems, respectively, to obtain two series of data strings, and reconstructing them on the basis of a bit arrangement of a known specific pattern portion. Accordingly, both of high density recording and reproduction and accurate tracking can be accomplished simultaneously.

Furthermore, since minute wobblings in the track depth-wise direction are provided alternately with opposite phases for each adjacent pair of tracks, any influences on recorded pits due to thermal interference that becomes a problem in a thermal recording medium can be reduced. A PLL (Phase Locked Loop) circuit is used for the reproduction clock generation means and its response band is set to a frequency higher than the wobbling frequency. Accordingly, a noise band of the PLL circuit can be narrowed and excessive response to any defect on the disk can be prevented. Therefore, wobbling fluctuation can be followed more accurately and a change of the data pit length and the edge position due to the servo change and to the influence of wobbling can be suppressed.

In optical systems wherein two or more optical beams scan on the same track, too, the use of the wobbling tracks can enable position control by the change of the reflected light power in place of conventional diffracted light tracking. Accordingly, it is possible to simplify the servo system and to accomplish a system in which an offset is unlikely to occur with respect to aberration of the optical spots and to the inclination of the disk.

In the sample servo of the CAV system, on the other hand, the length of the circumference becomes progressively greater towards the outer peripheral side of the disk. Therefore, both of the servo areas and the data areas become progressively longer towards the outer peripheral side in proportion to the radius. Therefore, the physical gap between the data pits in the servo area as well as in the data area becomes the smallest on the inner circumference and becomes progressively greater towards the outer peripheral side.

Furthermore, since the disk rotates at a constant angular velocity in the CAV system, the linear velocity is different between the inner circumference and the outer circumference. In other words, setting of the recording condition for recording data is different between the inner circumference and the outer circumference, and setting must be changed minutely depending on the track position. Furthermore, a large margin must be secured to obtain an optimum recording state, and requirements on the recording medium become more severe.

To avoid these problems, the CLV system is often employed in place of the CAV system. However, the following problem occurs when the CLV system is used for the sample servo. For example, if areas are continuously packed from the innermost peripheral side, the length of the circumference becomes progressively greater towards the outer periphery. For this reason, the positions of the servo and data areas are not aligned linearly in the radial direction with respect to the disk, and the positions of the clock marks inside the servo areas, too, deviate between the adjacent tracks. Then, when the optical spot effects an access operation while crossing the tracks transversely, the time intervals in which the clock marks appear become irregular, so that synchronization of the clocks collapses. This means that the access operation itself becomes impossible in the sample servo because the servo signals such as the off-focus signal, the offtrack signal or the optical spot moving signal for access are detected by the use of the clocks which are synchronized with the clock marks.

It is therefore still another object of the present invention to provide a format structure and an optical disk apparatus which can record a greater quantity of data in an optical disk using the sample servo, and can reduce a burden to a recording/reproduction system or a recording medium.

From another aspect of the present invention, each of a plurality of tracks of a disk in which servo areas and data areas on the tracks are aligned linearly is divided into a plurality of zones in order to accomplish the object described above. Furthermore, there are disposed a circuit for identifying a zone to which a given track belongs from an address signal of the track or from an address signal of an access destination, and a circuit for controlling the rate of revolution of a spindle motor to change the rate of revolution of the disk depending on the zones. Furthermore, servo clock generation means and data clock generation means are disposed separately, and detection of servo signals and recording and reproduction of data are carried out by separate clocks and timing signals. The data clock generation means changes the frequency division ratio in each of the identified zones, and can thus change the data quantity recorded in the data area for each zone.

More definitely, the zone number is identified from a present track address or a track address of a destination to be accessed, and signals for changing the rate of revolution of the spindle motor and the division number of the data clock generation circuit are generated from the zone number. First, the rate of revolution of the spindle motor is changed for each zone on the basis of the former signal in such a manner as to attain a substantially constant linear velocity throughout the entire disk surface. In other words, the rate of revolution is high in the zones on the inner peripheral zones and low in the zones on the outer peripheral side. The division number of the data clock generation circuit is changed on the basis of the latter signal so that a recording/reproduction clock has a constant frequency. In other words, since the rate of revolution of the disk changes depending on the zones, the interval in which the clock marks appear changes, too, but the original oscillation frequency of the PLL is prevented from changing even when the appearance interval of the clock marks changes, by changing the division number of the PLL inside the data clock generation circuit.

Since the linear velocity is substantially constant on the disk and the frequency of the recording/reproduction clock is constant, too, the data pitch becomes substantially constant. In contrast, since the servo areas and the data areas are aligned linearly in the radial direction, the physical gaps of the data areas become progressively greater towards the zones on the outer peripheral side. For this reason, a data quantity in one data area becomes progressively greater in the zones on the outer peripheral side.

The length of the servo areas, too, becomes progressively greater in the zones on the outer peripheral side, and the pitch of the servo data inside the servo areas becomes greater, as well. Since the rate of revolution of the disk becomes progressively smaller in the zones on the outer peripheral side, the frequency of the clock for reproducing the servo data must be lowered. Since the number of division of the PLL inside the servo clock generation circuit is fixed, the original oscillation frequency of the PLL changes in accordance with the change of the appearance interval of the clock marks, and hence, the clock for reproducing the servo data changes, too. In other words, the rate of revolution of the disk decreases in the zones on the outer peripheral side and the appearance interval of the clock marks becomes greater, and the frequency of the clock for reproducing the servo data decreases. Reproduction of the servo data becomes possible by using this clock.

BRIEF DESCRIPTION OF THE DRAWINGS

FIGS. 14A and 14B are block diagrams each showing the shape of a light reception surface of an optical detector of the optical head in another embodiment shown in FIG. 13;

FIG. 17 is an explanatory view showing the segment structure of an optical disk according to the present invention;

FIG. 18 is an explanatory view showing an example of a servo data structure inside a servo area according to the present invention;

DESCRIPTION OF THE PREFERRED EMBODIMENTS

Hereinafter, preferred embodiments of the present invention will be explained in detail with reference to the accompanying drawings.

Figure 1:
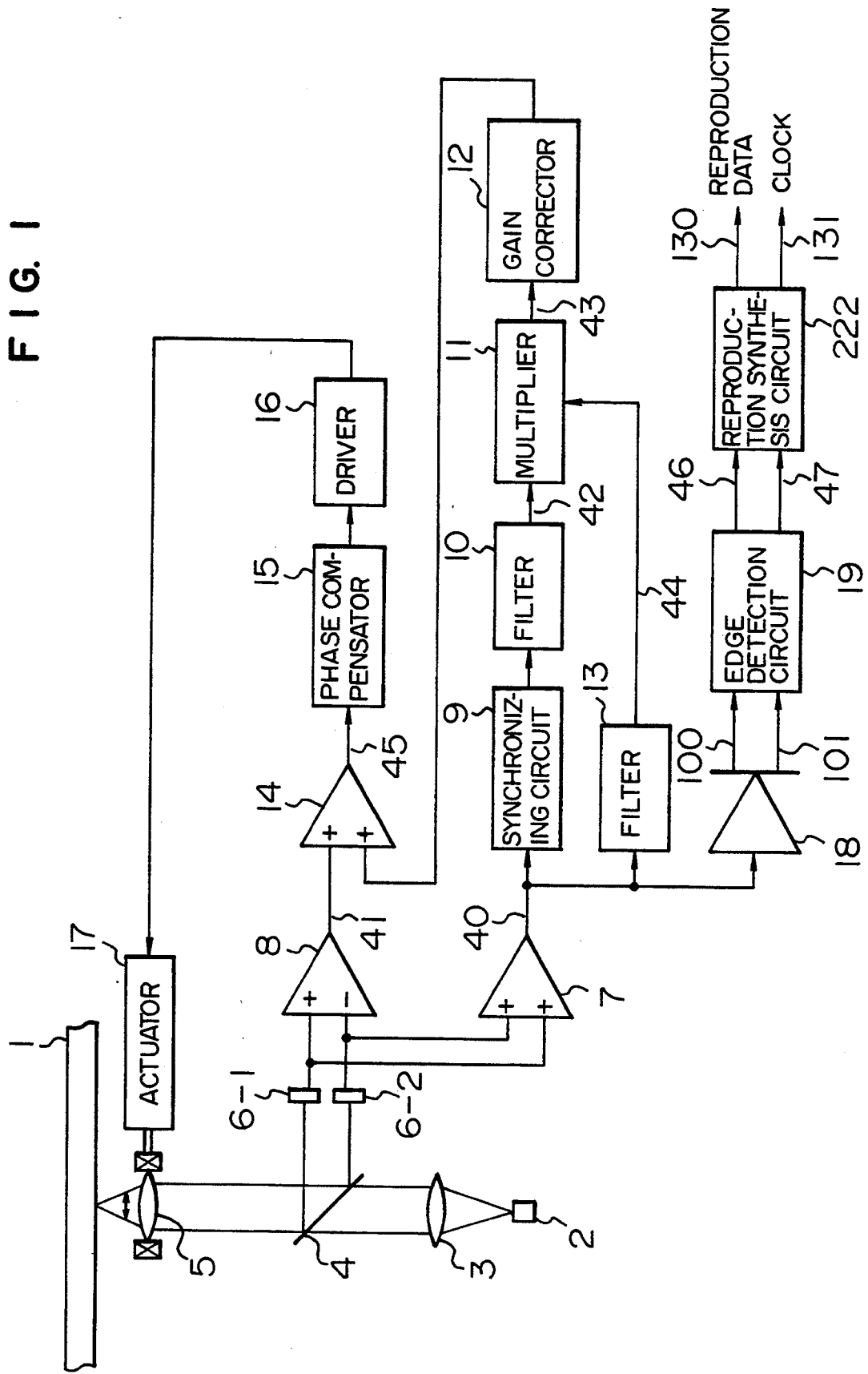
FIG. 1 is a block diagram showing the fundamental construction of a data recording/reproduction apparatus according to an embodiment of the present invention.

FIG. 1 is a block diagram showing the construction of an apparatus of the invention and is useful for explaining one of the embodiments thereof. The fundamental construction of the apparatus includes an optical disk and optical heads used for recording and reproducing data, a tracking servo circuit system corresponding to a wobble track, a reproduction circuit system of a front edge reproduction pulse of recording pits, a rear edge reproduction circuit system, and a resynthesis circuit system of reproduction pulse trains of both of the systems. In FIG. 1, an explanation will be given centering about a tracking servo system for wobble tracks which are disposed in a scanning direction of a track and are minutely displaced. If a focus servo system, too, has the same structure as that of the tracking servo system in FIG. 1, offset detection and correction can be executed always in a direction of focus (generally, in a vertical wobbling direction).

FIG. 1 assumes the case where the change of a disk reflection factor is used as a recording form of a recording medium. More definitely, the recording medium is an ablative (write-once) medium or a phase-change medium. Even when other kinds of recording media are used, the construction of the present invention can execute processing in the same way so long as reproduction data can be converted to a light intensity by an optical detector for signal detection. In the case of an opto-magnetic medium, for example, the rotation of the plane of polarization in accordance with the direction of vertical magnetization is converted to the change of the optical intensity by an optical device allowing the selective passage of only a certain polarization component, such as an analyzer, and thereafter the processing can be carried out similarly.

In FIG. 1, data tracks are disposed either concentrically or spirally on the disk 1 for data recording and reproduction. Each track is minutely wobbled at a frequency above a servo band frequency for track following but below a reproduction signal frequency. The minute wobblings are disposed alternately in opposite phases in the direction of depth for each adjacent pair of tracks and in this way, detection and correction of focus offset can be executed at the time of automatic focus control. A definite example of the form of the wobbling tracks formed on the disk will be described later.

An optical beam of a light source 2 such as a laser is focused on a data surface on the disk 1 by a focusing lens 5 through an optical device such as a half mirror or a prism. The reflected beam modulated by data pits existing on a track of the disk 1 is again reflected by the optical device 4 and is converted to electric signals by the optical detectors 6-1, 6-2. The optical detectors 6-1, 6-2 are split along the track direction, and their outputs are inputted to an adder 7 and a subtractor 8, respectively.

When data are recorded on the write-once optical disk, modulation is effected in accordance with the modulated data so that the optical source 2 has higher optical power than at the time of reproduction, and the temperature of the recording film of the disk 1 is raised so that the recording film is molten and evaporated by the heat, whereby the pits are formed. In the case of the phase-change optical disk, recording is carried out by changing the refractive index of the recording film by the difference of modes of application of the heat to be applied by optical spots. In the case of the opto-magnetic disk, further, a vertical magnetization film is used as the recording film, and the direction of magnetization is set either above or below the recording film surface by the heat applied by the optical spot. Data reproduction is effected by detecting the existence of the pits as the direct change of the reflected light power from the disk recording surface in the case of the write-once and phase-change type media. In the case of the opto-magnetic disk, the existence of the data domains is detected by converting the relative rotation of the plane of polarization of the incident light to the recording film due to the magneto-optical effect with respect to the direction of magnetization, to the change of optical light power by an optical device such as an analyzer. The detection of the data pits is made from the output 40 of the adder 7. In the case of the opto-magnetic disk, the detection of the data domains can be made similarly by using the signal after conversion to the light power described above.

Figure 2:
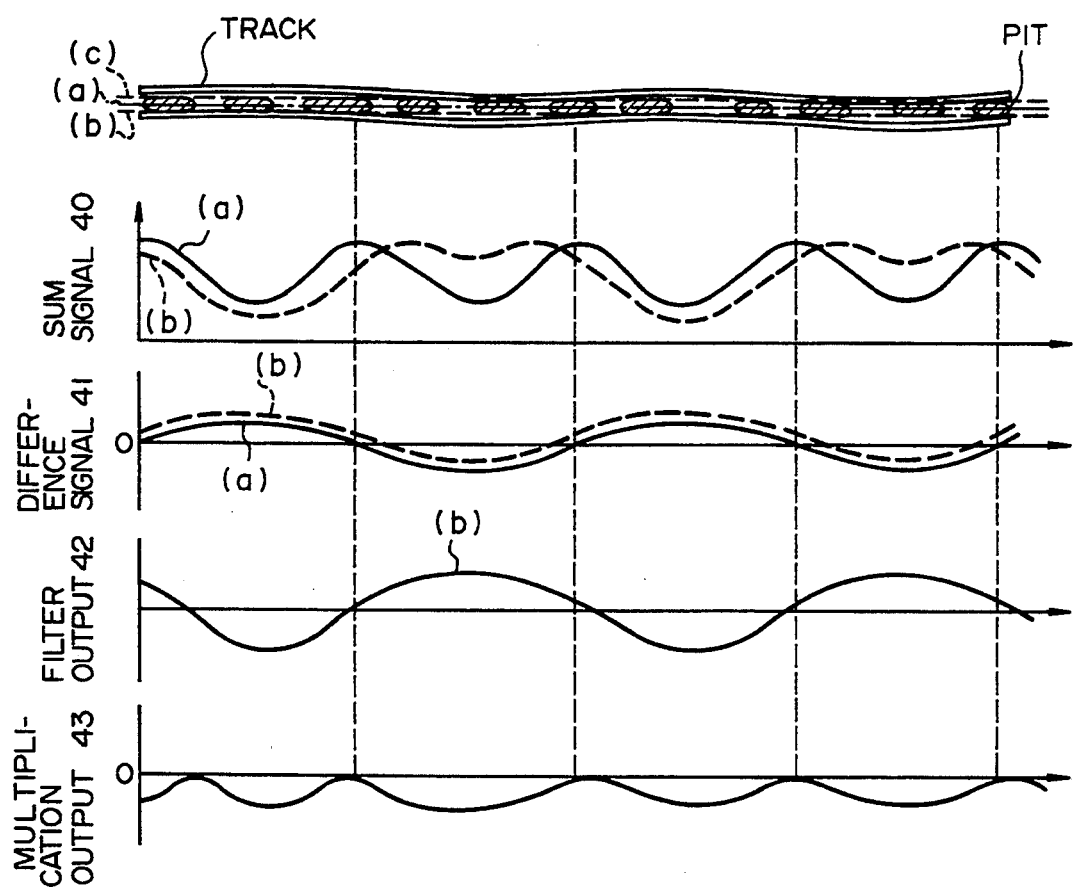
FIG. 2 is a signal waveform diagram at each portion of the apparatus which is useful for explaining a track following operation in FIG. 1.

FIG. 2 is an explanatory view useful for explaining the tracking method when a wobbling track is used. Hereinafter, the explanation will be given with reference to FIGS. 1 and 2. A sum signal output 40 is inputted to a synchronizing circuit 9 and to a filter 13. Waveform (a) in FIG. 2 shows the case where an optical spot scans on a mean center line of the wobbling track. At this time, a difference signal 41 passes a zero point when the optical spot is positioned at the track center. On the other hand, the same signal 40 becomes maximal at this time. Since this embodiment assumes the case where tracking is made on a flat region (land) between track guide grooves, the reflected light from the disk becomes maximal at the instance that the optical spot position exists at the center of the land described above. Therefore, the sum signal 40 takes the greatest value.

Now, consider the case (b) where the optical spot position undergoes downward displacement in the drawing. At this time, the maximum value of the sum signal 40 changes in such a fashion that its phase is deviated from the phase shown in (a). Similarly, the zero point of the difference signal 41 is deviated from that in (a). Therefore, the position of a lens 5 may be controlled by driving an actuator 17 for tracking in such a manner as to correct this deviation. Here, the frequency of the sum signal 40 is twice the frequency of the difference signal 41 and the wobbling frequency. The sum signal 40 is inputted to the synchronizing circuit 9, detects a certain reference position on the disk and recognizes that a wobble cycle starts from this reference point. It is possible to use an elongated pit (mark) which cannot exist in the data, or a portion devoid of the track guide groove (mirror portion) as means for representing this certain reference position. The output 42 of the filter 10 is a signal obtained by extracting components of the sum signal 40 near the wobbling frequency. On the other hand, the filter 13, too, is a band-pass filter for the wobbling frequency. The product of the output 42 and the output 44 by a multiplier 11 can be obtained as a multiplication output 43.

FIG. 2 shows output signal waveforms when the optical spot position undergoes displacement as shown in (b). In this case, the output 43 becomes a signal having a polarity in a negative direction, and a tracking servo control error signal is generated by changing this signal to a signal having an appropriate level by a gain corrector 12 and then adding it to the output 41 of the subtractor by the adder 14. The error signal output 45 is phase-compensated by a phase compensator 15, and drives the actuator 17 by a driver 16 to control the position of the lens 5. Conversely, when the optical spot deviates from the track as shown in (c), the control can be effected in the same way with the exception that the polarity of the multiplication output 43 becomes opposite.

In FIG. 1, the detection of the data signal is made by inputting the outputs 100, 101 of the differential convertor 18 to an edge detection circuit 19 to obtain pulses 46, 47 corresponding to front and rear edges, respectively, processing them independently by a reproduction data synthesis circuit 222, and reconstructing them as their original data trains. The operation of this portion will be described later in further detail.

Figure 3:
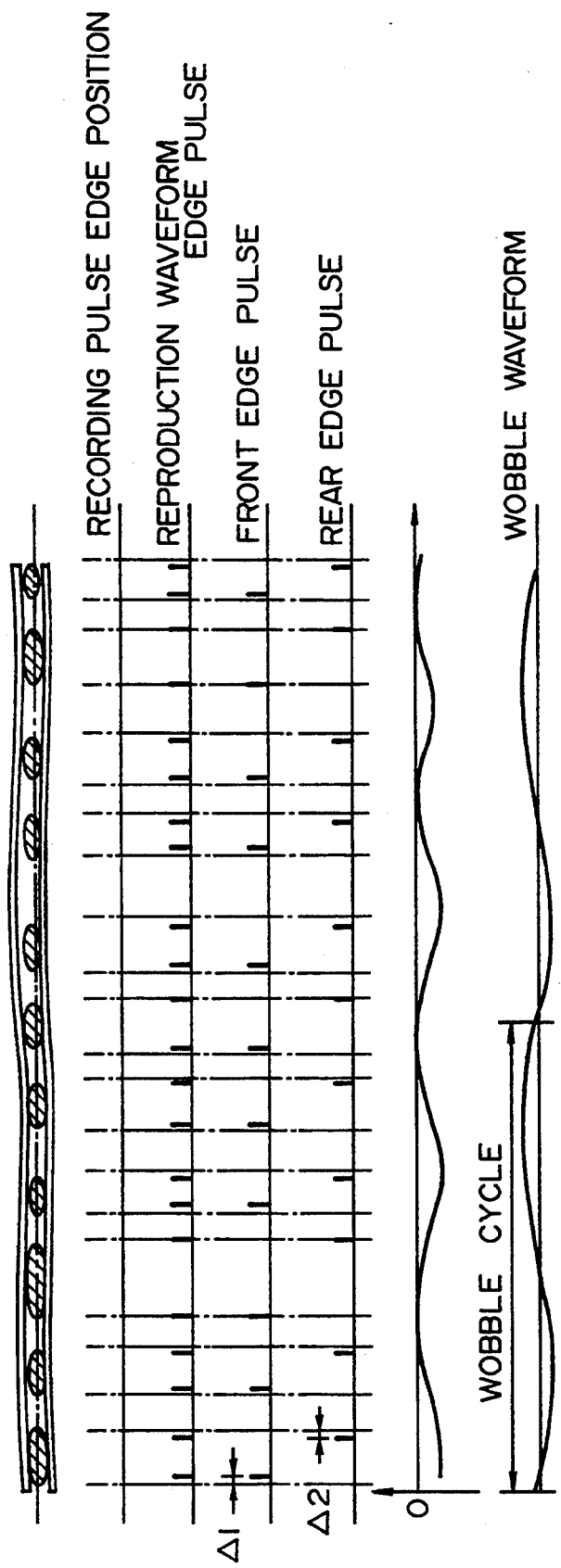
FIG. 3 is a diagram showing examples of reproduction signal waveforms from recording pits on a wobble track.

FIG. 3 is a diagram showing the relation between pits or domains recorded on a wobbling track and reproduction pulses obtained from them. It will be assumed here that data pits are recorded on the flat portions (lands) between track guide grooves. Discussion can be made similarly when the data pits are recorded on the guide grooves.

A pit edge recording system is employed as the data recording system. According to the pit edge recording system, specific code word data, such as "1", are so arranged as to correspond to the front and rear edges of the pit, and a shift of the edge position due to the interference between the waveforms does not occur till the edge gap reaches the distance of the half of the effective diameter of a reproduction spot. In comparison with a conventional recording system wherein code word data correspond to the center positions of the pits, a linear recording density can be improved consequently. By the way, the distance between the pit centers at which the edge shift does not occur according to the conventional recording system is given by the sum of half of the effective spot diameter and the bit diameter.

When the pits are recorded on the wobbling track in the case where the edge positions of the recording pulse are given as shown in the drawing, the wobbling frequency, or in other words, the displacement frequency in the track scanning direction, is higher than the track following servo frequency (or tracking servo frequency) for the position control of the optical spot. For this reason, the pit positions appear as if they were wobbled from the track center. Therefore, since the distance between the pit and the track guide groove changes incessantly, the pit length detected from the reproduction waveform appears as if it were extended, or contracted, due to the influences from the groove. More definitely, the pit length appears as if it were changing in such a manner as to correspond to the wobbling cycle as represented by the edge pulse train of the reproduction waveform shown in the drawing. The following (response) frequency band of a PLL (Phase Locked Loop) circuit for generating the reproduction clocks from the reproduction pulse train is set to be lower than the reproduction pulse frequency of the recording data. If the width of the response band of the PLL circuit is reduced in this way, the noise band of the PLL circuit itself can be narrowed and at the same time, it becomes possible to prevent the PLL circuit from responding excessively sensitively to any defects on the disk, or the like. Furthermore, a large reproduction error is not generated for the edge shift such as extension and contraction of the pit length. When the front edge pulse and the rear edge pulse at the time of reproduction are inputted to a single reproduction clock generation system of the prior art system such as the system of JP-A-62-254514, the PLL circuit cannot follow a sharp change for each edge shown in the drawing, so that the shift is judged as occurring when inspection is made from a data inspection window generated from the reproduction clocks.

Therefore, the shift described above can be eliminated by separating the front edge pulse and the rear edge pulse by a method to be described later and handling them respectively as signal pulse trains of different systems. In other words, only the components of each of the front and rear edge pulses which fluctuate at the wobbling frequency remain.

The drawing shows the phase shift waveform ($\Delta 1$) of the reproduction pulse for the front edge pulse of the recording pulse. This also holds true of the phase shift ($\Delta 2$) of the rear edge side. The frequency of this fluctuation component (wobbling frequency) is sufficiently lower than the response frequency of the PLL circuit system, and can be followed by the PLL circuit system. Examples of numeric values of following bands (response bands) are as follows:

tracking servo band = 1 to 3 KHz
wobbling frequency = 20 to 40 KHz
PLL system band = 200 to 400 KHz
reproduction signal frequency = several mega-Hz to dozens of mega-Hz As described above, the fluctuation frequency in the order of several mega-Hz for each pit can be lowered to near to the wobbling frequency by handling independently the front and rear edges, and consequently, following by the PLL system becomes possible. In this way, the fluctuation of the pit length at the time of reproduction, which would otherwise be the problem in the wobbling track system and is effective for the detection and correction of the track offset, can be eliminated.

Figure 4:
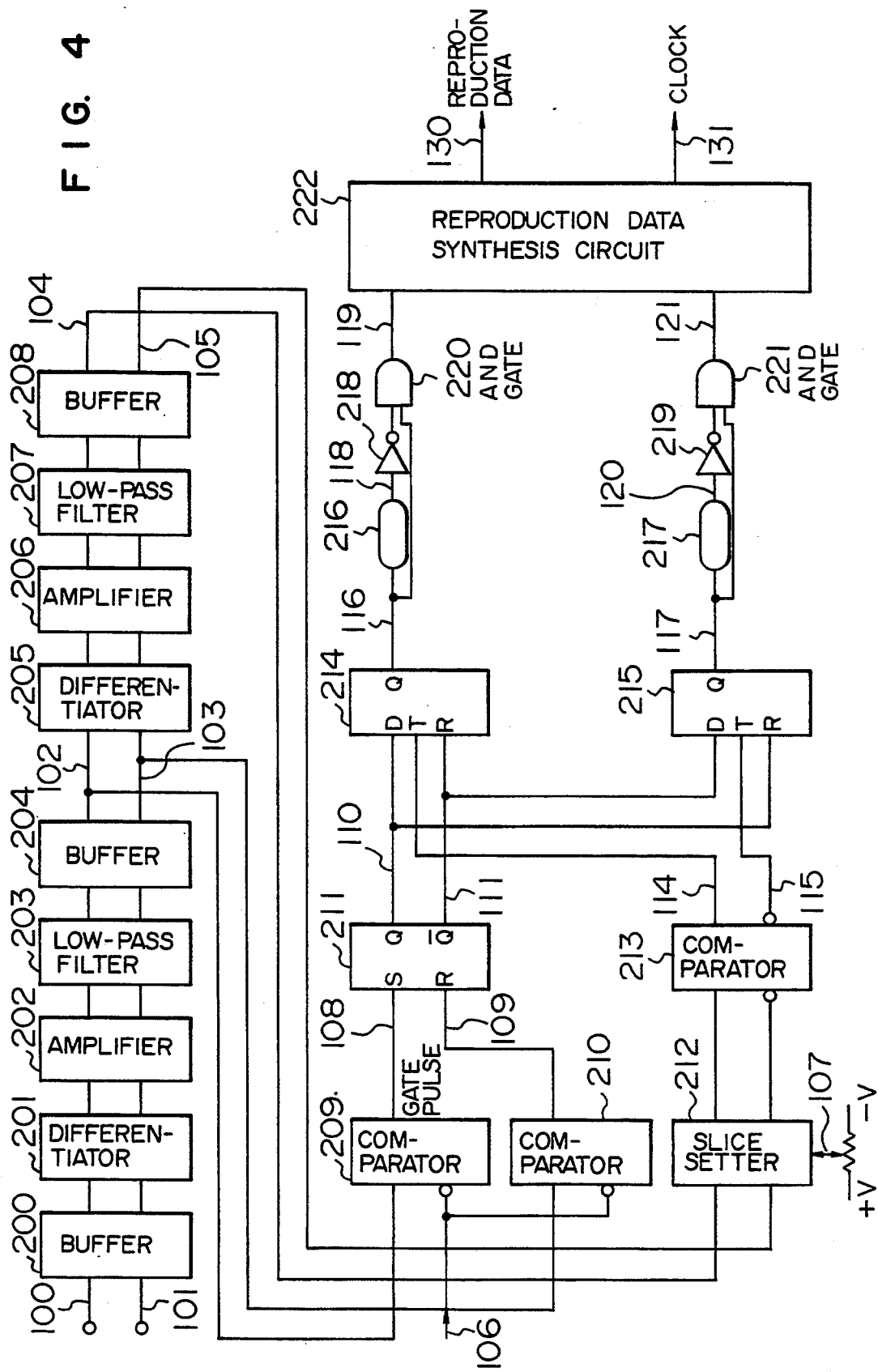
FIG. 4 is a block diagram showing an example of a data reproduction circuit system.
Figure 5:
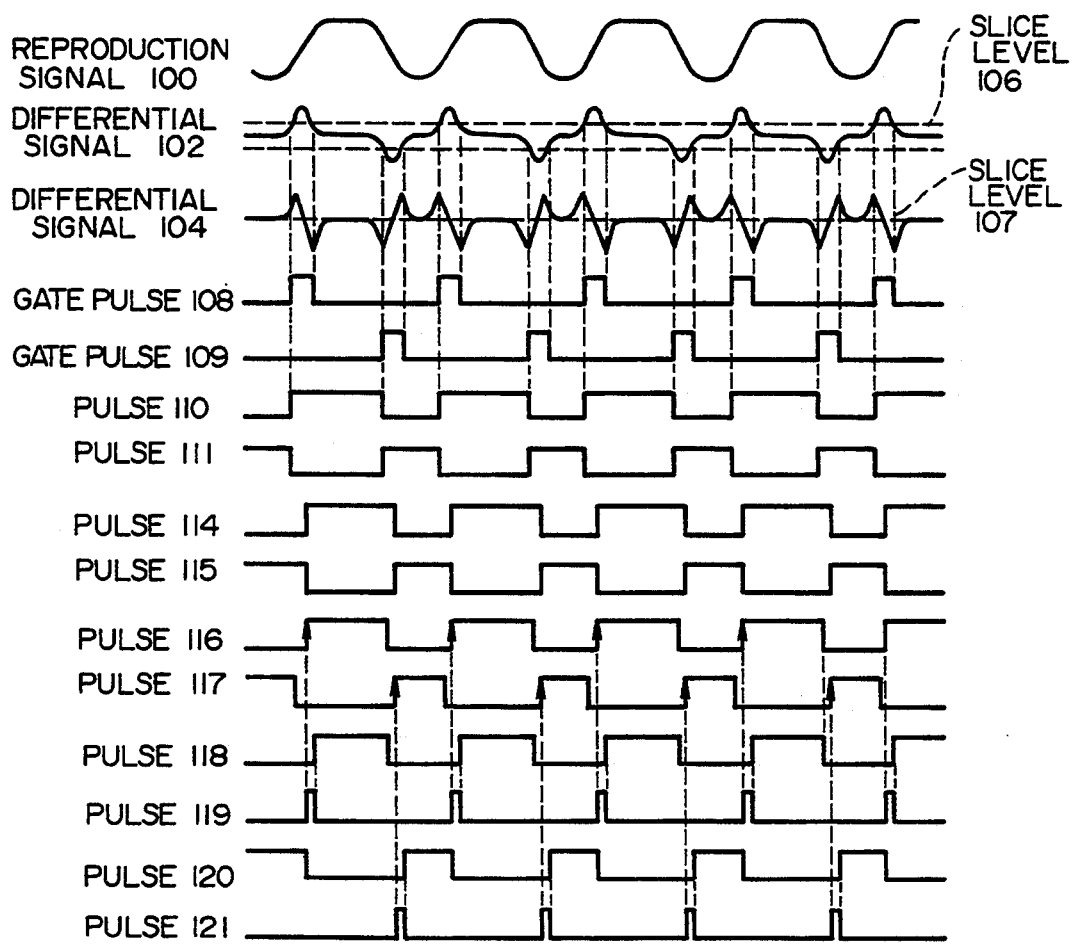
FIG. 5 is a diagram showing signal waveforms, and is useful for explaining a reproduction pulse generation process.

FIG. 4 shows an example of a definite circuit construction from the output 40 of the adder 7 (FIG. 1) to the synthesis of the reproduction data 130 and the generation of the clock 131 synchronized with the reproduction data 130. FIG. 5 is a diagram useful for explaining the operation of the circuit shown in FIG. 4.

An explanation will be given on the pit edge recording system as an example of the data pit recording systems. The output 40 of the adder 7 is inputted as differential signals 100 and 101 by the differential convertor 18 to a buffer 200. This reproduction circuit system is described by differential signals. The reproduction signals 100 and 101 correspond to the existence of the pits recorded on the disk, for example. Generally, the level of the reproduction signal drops much more than a non-recorded level at the pit portions due to the drop of the reflection factor.

The output of the buffer 200 is inputted to a differentiator 201 to obtain a differential signal. After this signal is amplified to a suitable level by an amplifier 202, the signal passes through a low-pass filter 203 and is again inputted to the buffer 204. First-order differential signals 102, 103 are obtained as the output.

In edge recording, the positive and negative positions of the first-order differential signals correspond to the front and rear edge positions of the reproduction signal, respectively. Differentiation is again effected so as to obtain this peak position. After the signal is differentiated by a differentiator 205, the signal passes through an amplifier 206, a low-pass filter 207 and a buffer 208, and there are obtained second-order differential signals 104, 105. The zero-cross points of the second-order differential signals correspond to the peak positions of the first-order differential signals 102, 103. The first-order differential signals 102, 103 are inputted to comparators 209, 210 to generate gate pulses 108, 109. Here, a slice level 106 is a threshold value for generating the gate pulses 108, 109 and for preventing erroneous pulses generated from positions other than the zero-cross positions of the second-order differential signals from being recognized as the data. The gate pulses 108, 109 are inputted to the set (S) and reset (R) of a flip-flop 211, respectively, and pulses 110 and 111 can be obtained as the output (Q). On the other hand, the second-order differential signals 104, 105 are inputted to a slice setter 212. A comparator 213 is a differential comparator and outputs pulses 114 and 115. Furthermore, the pulses 114 and 115 are inputted to the triggers (T) of flip-flops 214 and 215, respectively, and the pulses 110 and 111 are inputted to these flip-flops 214 and 215. Accordingly, the pulse 110 is accepted using the rise of the pulse 114 as a trigger and the flip-flop 214 is reset under the "H" level of the pulse 111, to thereby obtain a pulse 116. This also holds true of the pulse 117. An inversion pulse of the signal 118, which is obtained by delaying the pulse 116 by a delay device 216 and inverting the signal by an invertor 218, and the original pulse 116 are subjected to an AND operation by an AND gate 220 to provide a pulse 119. Similarly, an inversion pulse of the signal 120, which is obtained by delaying the pulse 117 by a delay device 217 and inverting it by an invertor 219, and the original pulse 117 are subjected to the AND operation by an AND gate 221 to provide a pulse 121. These data pulses 119 and 121 correspond to the front edge and the rear edge, respectively. After these pulses are data-synthesized by a reproduction data synthesis circuit 222, there can be obtained reproduction data 130 and a clock 131 in synchronism with the former, and in this way, data demodulation is carried out.

Figure 6:
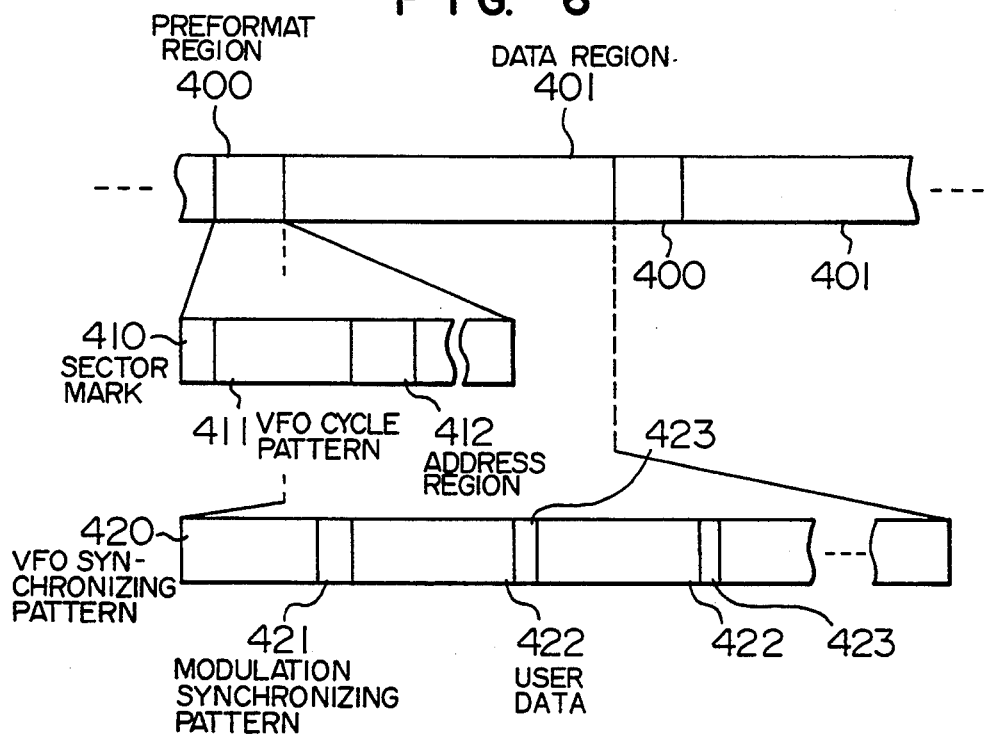
FIG. 6 is a diagram showing an example of a sector format structure of an optical disk.

Next, an example of a sector format for the synthesis of reproduction data will be explained. FIG. 6 shows a structural example of a certain sector format, which is broadly divided into a pre-format area 400 and a data area 401. The pre-format area 400 is divided into a sector mark 410 representing the sector start, a VFO synchronizing pattern 411 for generating a reproduction clock and an address area 412 in which track and sector addresses are recorded. User data are recorded in the data area 401. The data areas 401 include a VFO synchronizing pattern 420, a user data demodulation start pattern 421, user data 422 and a re-synchronizing pattern 423 for re-synchronizing a bit deviation of the reproduction clock in the user data.

Synthesis of reproduction data is effected by the use of a specific pattern inside the format described above. Here, an explanation will be given on the case where the VFO synchronizing pattern is used.

Figure 7:
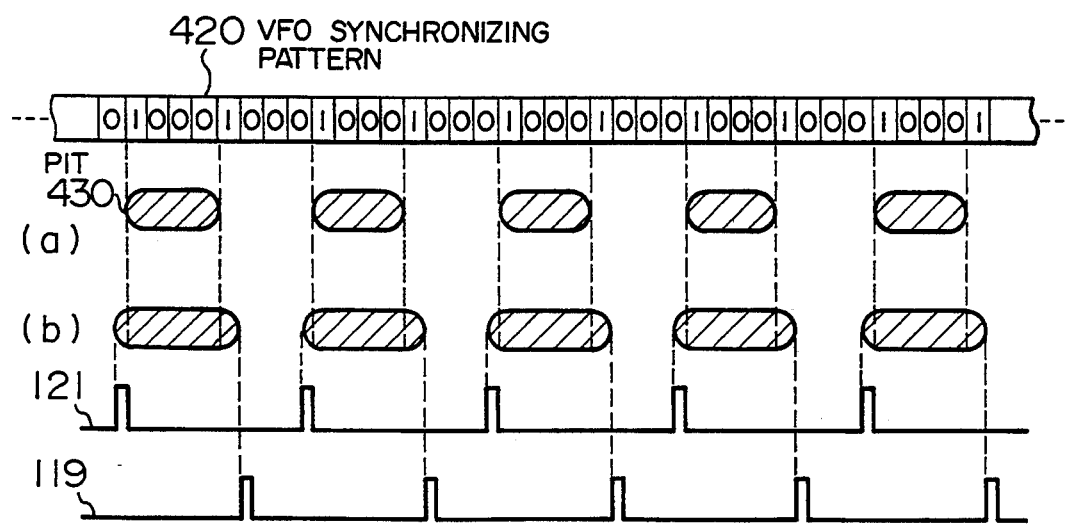
FIG. 7 is an explanatory view useful for explaining the relation between a VFO synchronizing pattern and a reproduction pulse.

The VFO synchronizing pattern generally uses the repetition of a certain predetermined pattern. FIG. 7 shows the relation between a code word pattern of the VFO synchronizing pattern 420 and bits 430 corresponding to the former. Ideally, recording is made in such a manner that "1" of the code word corresponds to each of the front and rear edges of the pits as shown in (a). In practice, however, they do not coincide with one another due to the characteristics of the recording medium used or due to the fluctuation of the recording condition as shown in (b).

Since the VFO synchronizing pattern is already known, correct reproduction can be accomplished for subsequent pattern strings even under the state shown in (b), if the reproduction pulses 121 and 119 can be corrected to the normal positional relation. According to the present invention, the reproduction pulses 121 and 119 are inputted to mutually separate VFO circuits to generate the reproduction clocks, and the pattern in the area, where the trailing condition of the latter half portion of the VFO synchronizing pattern 420 gets sufficiently stabilized, is used as the reference pattern for the synthesis of the reproduction data. Furthermore, two series of reproduction data strings are stored in memory in such a manner as to attain a normal bit arrangement (order). According to this structure, stable data demodulation can be made even when the edge positions of the bit exceed a data detection window width.

Figure 8:
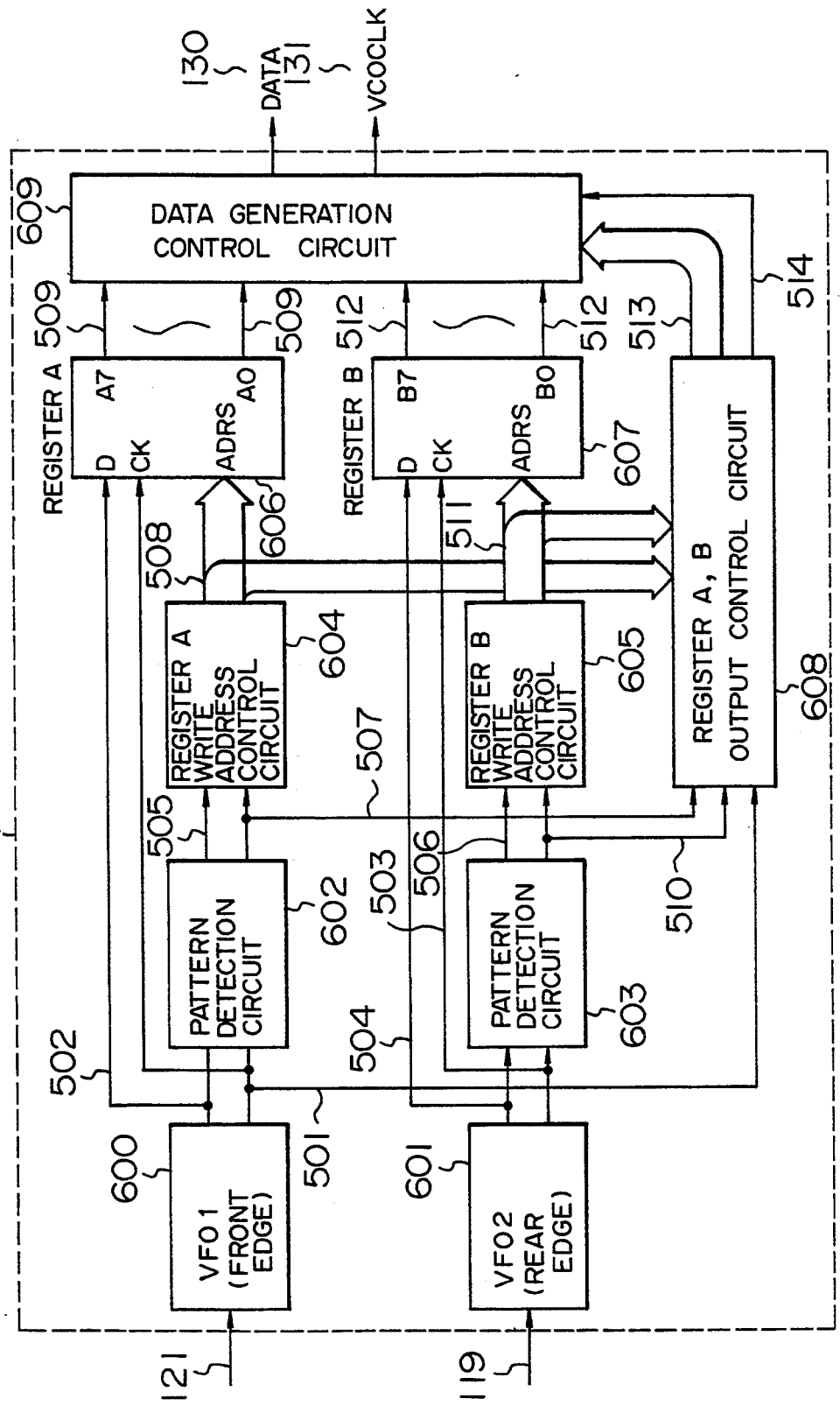
FIG. 8 is a block diagram showing an example of the fundamental structure of a reproduction data synthesis circuit.
Figure 9:
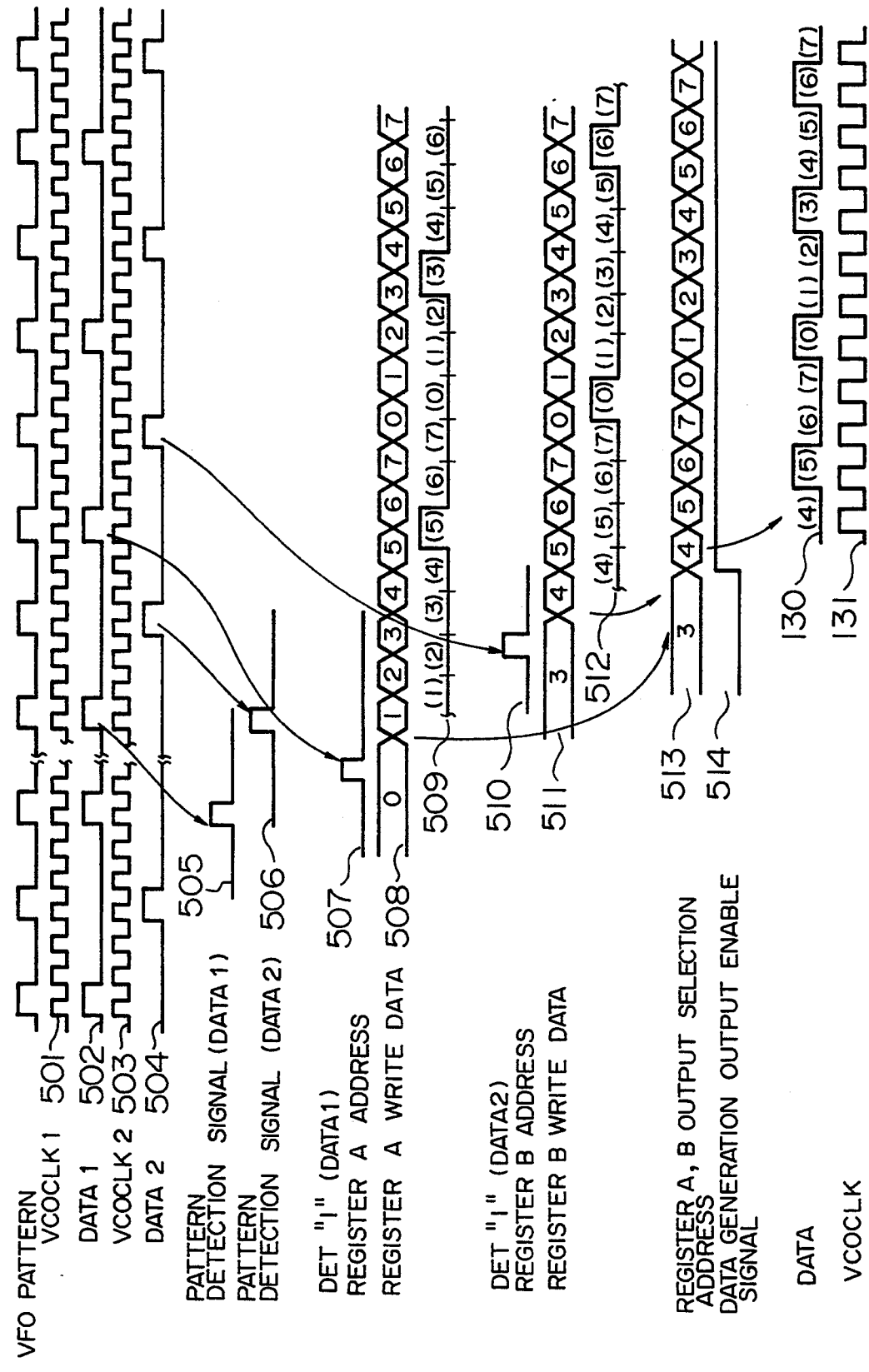
FIG. 9 is a time chart useful for explaining the reproduction data synthesis process in FIG. 8.

FIGS. 8 and 9 show a structural example of the reproduction data synthesizing circuit 222 and its operation time chart. The synthesizing circuit 222 comprises two series of VFO circuits 600 and 601 for the front and rear edges, respectively, pattern detection circuits 602 and 603, write address control circuits 604 and 605 for registers A and B, respectively, registers A606 and B607, an output control circuit 608 for the registers A and B, and a data generation control circuit 609.

The front edge data pulses 121 are inputted to the VFO1 circuit 600, and the VCO clock 501 and the data (DATA1) 502 synchronized with this clock are obtained. Similarly, the VCO 503 and data (DATA2) 504 are obtained from the rear edge data pulse 199 by the VFO circuit 601. The VFO circuit detects the phase difference between the input pulse and the output clock, and synchronizes the phase of the output clock with respect to the input pulse by correcting the detected phase difference. The following characteristics of the VFO circuit are determined by the band of the filter inside the VFO circuit.

In FIG. 9, the data 502 and 504 are shown effective at the fall of the corresponding clocks. The data and the clocks are inputted to the pattern detection circuits 602, 603, and pattern detection signals 505, 506 are outputted. The pattern detection circuits 602, 603 output the data "1" immediately after the pattern detection signals 505, 506 are outputted, as the detection pulses 507 and 510, respectively.

A D flip-flop is used as a circuit example, is set by the detection signal 505 and outputs the high level (H) data 502 immediately after the output becomes "H". This also holds true of the detection pulse 510. Count-up of the address 508 of the register A606 is started from the point of time at which the detection pulse 507 is inputted. Similarly, count-up of the address 511 of the register B607 is started from the point of time at which the detection pulse 510 is inputted.

The registers A606 and B607 function as memories of a serial input and a parallel output. Here, the write address 511 of the register B607 starts from "3" because the VFO synchronizing pattern uses the repetition pattern of "100". In terms of the number of clocks, the data "1" exists for three clocks.

This write start address 511 is determined by the VFO synchronizing pattern used. In this way, if the data written into the registers A and B are read out by the common address, the reproduction synthesis procedure is completed. When the address 511 of the register B activated by the detection pulse 510 from the pattern detection circuit 603 is counted up to "4", a data generation permission signal 514 is generated to represent that the reproduction synthesis procedure is completed for the subsequent data strings. Data 130 can be obtained by sequentially reading the outputs 509, 512 of the registers A and B by the common address 513. The clock 501 may be used as the clock 131. Alternatively, an arbitrary clock such as the clock 503 or the recording clock used for data recording may also be used.

Figure 10:
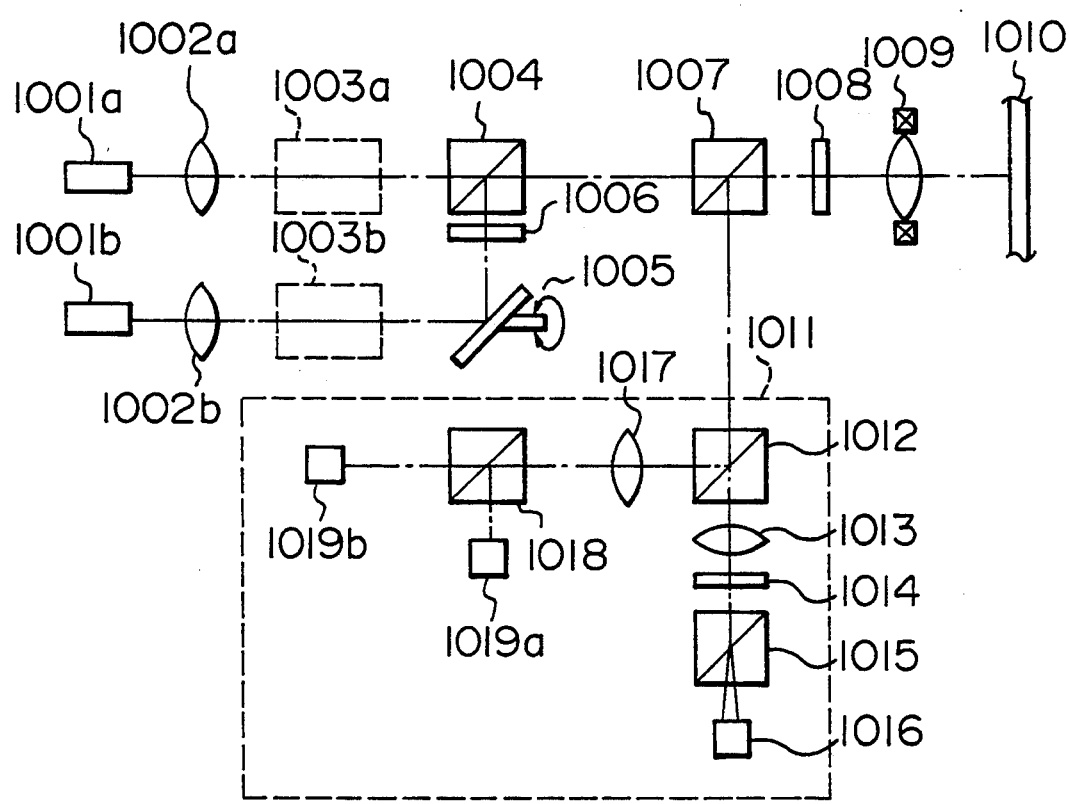
FIG. 10 is a block diagram showing an example of an optical head structure of an optical disk apparatus according to the present invention.

FIG. 10 shows a structural example of the optical head in a data recording/reproduction apparatus according to another embodiment of the present invention. The construction of the apparatus shown in FIG. 1 illustrates the case of one beam, and FIG. 10 shows the structural example of two beams.

FIG. 10 shows an optical head having two laser sources with mutually different wavelengths mounted thereto. The beam emitted from a laser source 1001a having a wavelength $\lambda_1$ is converted to a collimated beam by a collimating lens 1002a, and is focused onto the disk 1010 through a beam shaping optical system 1003a, a wavelength filter 1004, a polarized beam splitter 1007, a wavelength plate 1008 and a focusing lens 1009. On the other hand, the beam emitted from a laser source 1001b having a wavelength $\lambda_2$ is converted to a collimated beam by a collimating lens 1002b, and passes through a beam shaping optical system 1003b. After its travelling direction is changed by a Galvano-mirror 1005, the beam passes through a diffraction grating 1006 and is then combined with the laser flux of the wavelength $\lambda_1$ by the wavelength filter 1004. Thereafter, this beam passes through the polarized beam splitter 1007, the wavelength plate 1008 and the focusing lens 1009, and is focused onto the disk 1010. The beam shaping optical systems 1003a and 1003b shown in the drawing may be omitted.

The wavelength plate 1008 is set in such a fashion that the phase difference generated by it becomes substantially an integer multiple of one of the wavelengths of the two laser sources described above and becomes substantially ¼ of the other wavelength. It will be assumed here that a wavelength of around 780 nm is used as the wavelength $\lambda_1$ and another wavelength of around 680 nm is used as the wavelength $\lambda_2$, the former being used for recording the data and the latter for the error check after recording. At this time, the phase difference of the wavelength plate is set to twice the wavelength 680 nm (a 2λ plate when λ=680 nm). Since the phase difference is an integer multiple of the wavelength, no substantial phase difference occurs even when the beam having the wavelength 680 nm passes through this wavelength plate. On the other hand, when the beam of the wavelength 780 nm passes through this wavelength plate, the following phase difference occurs:

$$2\times(780-680)/780=0.256\lambda$$

In other words, the wavelength plate functions as an approximate ¼ wavelength plate for the beam of the wavelength 780 nm.

In this embodiment, recording of data is effected by the optical spot having the wavelength 780 nm and reproduction of the recorded data and the error check are effected by the optical spot having the wavelength 680 nm. (However, data which are not recorded as the opto-magnetic signals, such as the address data, are reproduced by both of the optical spots.) In this case, the luminous flux of the wavelength 780 nm preferably has the highest possible light utilization efficiency. Therefore, the structure of the optical head of the conventional write-once type is preferred. To reproduce the opto-magnetic signal spot having the wavelength 680 nm, on the other hand, the structure of the conventional optical head for the opto-magnetic disk is preferred. The former optical system can be accomplished by inserting a ¼ wavelength plate into the focused luminous flux. However, the conventional system cannot reproduce the opto-magnetic signals because a circularly polarized beam is irradiated to the disk.

The use of the conventional write-once disk optical head for the luminous flux of the wavelength 780 nm and the conventional optical head for the optomagnetic disk can be accomplished simultaneously by inserting the wavelength plate according to the present invention into the focused luminous flux, using components satisfying the below-mentioned characteristics for the polarized beam splitter 1007 and setting the optical system in such a manner as to allow the luminous flux of the p-polarized beam to be incident:

p polarized beam transmission factor $T_p$: ~70% (λ = 680 nm),
    >90% (λ = 780 nm)

s polarized beam reflection factor $R_s$: >95% (λ=680, 780 nm)

The polarized beam splitter having the optical characteristics described above can be accomplished.

As described above, it is possible to set the optical characteristics (reflection factor, transmission factor, etc) of the optical components to be mounted to the optical head for the optical disk having a plurality of light sources of different wavelengths mounted thereto, to different values for the wavelength corresponding to each spot in accordance with the role of each optical spot.

In this embodiment, the diffraction grating 1006 is interposed between the wavelength filter 1004 and the Galvano-mirror 1005. According to this arrangement, the distance between the diffraction grating 1006 and the focusing lens 1009 becomes great. Therefore, if a so-called "3-spot method" to be described later is employed as the offtrack detection method, there occurs the problem that an offset occurs in the offtrack detection signal due to the vignetting of the sub-spot. However, there is an advantage that the optical system can be made compact because the wavelength filter 1004 and the polarized beam splitter 1007 can be integrated with each other.

The diffraction grating 1006 can be disposed between the wavelength filter 1004 and the polarized beam splitter 1007, as well. In this case, a driver having a grating depth set so that the phase difference of the beam after passing through the grating becomes an integer multiple of one of the wavelengths can be used as the diffraction grating 1006. For example, when the grating structure is set so that the phase difference is an integer multiple of the luminous flux of the wavelength 780 nm, the diffraction grating functions as a diffraction grating for the luminous flux having the wavelength 680 nm but does not for the luminous flux having the wavelength 780 nm. In this way, it becomes possible to prevent the occurrence of unnecessary focused spots on the disk 1010.

According to the structure described above, the distance between the diffraction grating 1006 and the focusing lens 1009 can be made relatively small. Therefore, from the aspect of the occurrence of the offset in the offtrack detection signal described above, this embodiment is much more preferred to the embodiment shown in FIG. 10. According to this structure, however, the wavelength filter 1004 and the polarized beam splitter 1007 must be separated and disposed, and from the aspect of the reduction of the size of the optical system and the reduction of the number of necessary components, this structure cannot be said to be essentially desirable.

If the diffraction grating 1006 is disposed between the polarized beam splitter 1007 and the focusing lens 1009, the distance between the diffraction grating 1006 and the focusing lens 1009 becomes the smallest. Therefore, this arrangement is much more desirable than the two embodiments described above from the aspect of the occurrence of the offset in the offtrack detection signal. However, when this structure is employed, the reflected beam from the disk 1010 again passes through the diffraction grating 1006. In other words, since a plurality of unnecessary luminous fluxes are incident into the detection optical system, there occurs the problem that separation of the luminous fluxes in the detection optical system becomes much more difficult.

The explanation given above represents three examples of the position of the diffraction grating 1006, and the position should be selected appropriately from the aspects of the reduction of the size of the optical system, the occurrence of offset in the offtrack detection signal, the separation of the luminous fluxes in the detection optical system, and so forth.

Figure 11:
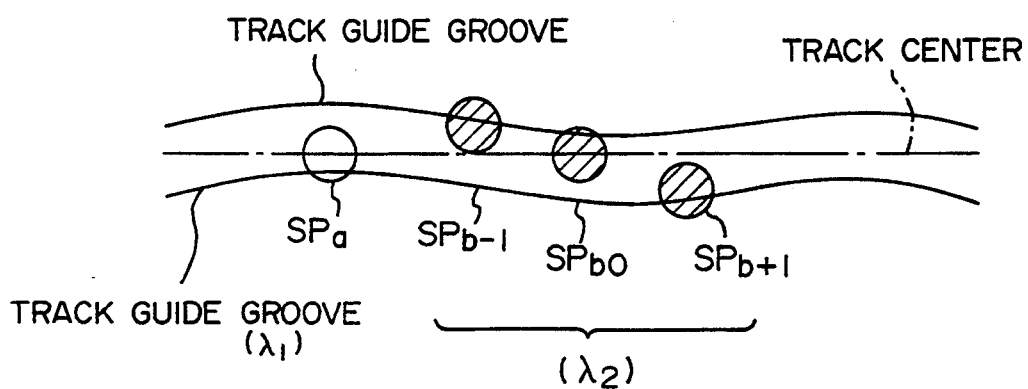
FIG. 11 is an explanatory view showing an example of a focusing spot state on the disk.

FIG. 11 shows an example of the arrangement of the focused spots on the disk according to this embodiment of the present invention. Zigzag guide grooves are formed on this disk so as to guide the optical spots. Each spot is focused onto the land portion between the grooves, and the data are recorded on the land portion between the grooves. Since the luminous flux having the wavelength $\lambda_1$ does not pass through the diffraction grating, the spot on the disk is only one spot SPa. On the other hand, since the luminous flux having the wavelength $\lambda_2$ passes through the diffraction grating, $\pm$1st-order diffracted beams $SPb_{+1}$ and $SPb_{-1}$ are focused besides the 0th-order beam $SPb_0$.

The reflected beam from the disk 1010 passes through the focusing lens 1009 and the wavelength plate 1008, is reflected by the polarized beam splitter 1007 and is then guided to the signal detection optical system 1011. Here, the off-focus signal, the offtrack signal, the recorded data signal, and the like, are detected. First of all, the wavelength separation is made by the wavelength filter 1012. The luminous flux having the wavelength $\lambda_2$ passes through the wavelength filter 1012 and the lens 1013, and the direction of its polarization is rotated by about 45° by the $\lambda/2$ wavelength plate 1014. Thereafter, the luminous flux is polarized and separated into two luminous fluxes by a Wallaston prism 1015 which are incident on optical detector 1016.

On the other hand, the luminous flux having the wavelength $\lambda_1$ is reflected by the wavelength filter 1012 and passes through the lens 1017. It is then separated by the beam splitter 1018 and the fluxes are incident on the optical detectors 1019a and 1019b for detecting the off-focus signal or the offtrack signal. In the structure shown in FIG. 10, the number of necessary components can be reduced by integrating the polarized beam splitter 1007 and the wavelength filter 1012. When a lens is disposed between the polarized beam splitter 1007 and the wavelength filter 1012, the lenses 1013 and 1017 can be replaced by one lens.

Figure 12A:
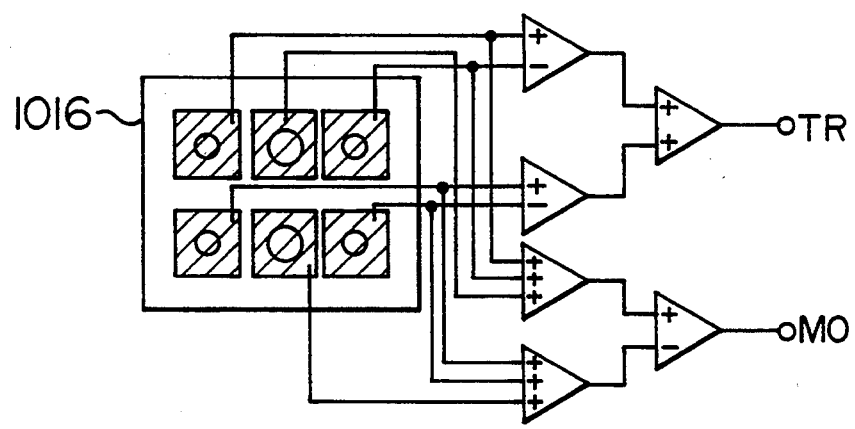
FIGS. 12A, 12B and 12C are explanatory views each showing the shape of a light reception surface of an optical head according to the present invention.
Figure 12B:
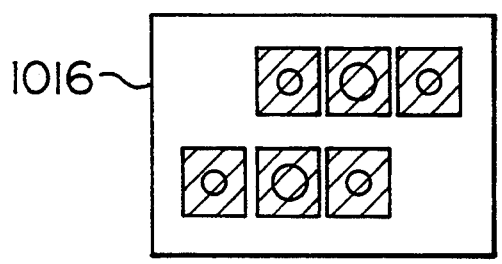
Figure 12C:
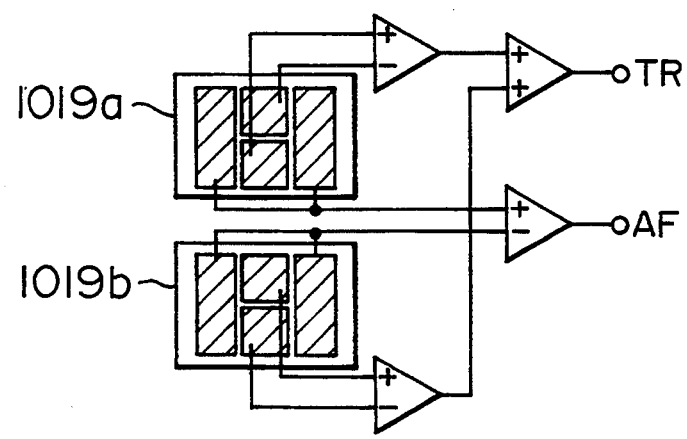

FIGS. 12A to 12C show examples of the shapes of the light reception surface of each optical detector. FIG. 12A shows the shape of the light reception surface (with the light reception surface being hatched) of the optical detector 1016. The offtrack signal TR (so-called "three-spot system") and the opto-magnetic signal MO can be obtained by the operation shown in the drawing. When the $\lambda/2$ wavelength plate 1014 is not used, the Wallaston prism 1015 may be rotated by about 45° round the optical axis and set. The shape of the light reception surface at this time is shown in FIG. 12B. FIG. 12C shows the shapes of the light reception surfaces of the optical detectors 1019a and 1019b (with the reception surface being hatched). Both optical detectors are disposed equidistantly at the front and back of the focus of the lens 1017, respectively, and the offtrack signal TR (so-called "diffracted beam differential system") and the off-focus signal AF can be obtained by the operation shown in the drawing.

As described above, a wavelength around 780 nm is used for the wavelength $\lambda_1$ and another wavelength around 680 nm is used for the wavelength $\lambda_2$ as the wavelengths of the light sources, and data recording is made by the former while the error check after recording is made by the latter. In this way, the recorded beam can be reproduced by a shorter wavelength, and resolution of reproduction can be improved.

A servo for off-focus and offtrack is constituted by the signals obtained from the beam having the wavelength $\lambda_1$. In this way, offtrack of the recording spot, in particular, can be suppressed precisely, and data destruction due to so-called "out-of-track" can be restrained.

To effect the error check immediately after recording, the recording spots and the reproduction (check) spots must be positioned on the same track. To this end, the Galvano-mirror 1005 is rotated round the optical axis. The luminous flux moves on the optical detector with this rotation. However, since the offtrack signal is detected by the so-called "three-spot method", offset is difficult to occur in the offtrack signal. This is effective when a so-called "split type optical system", wherein only the focusing lens 1009 moves, is constituted. The rotation of the Galvano-mirror 1005 is controlled by the use of the offtrack signal by this reproduction spot.

Figure 13:
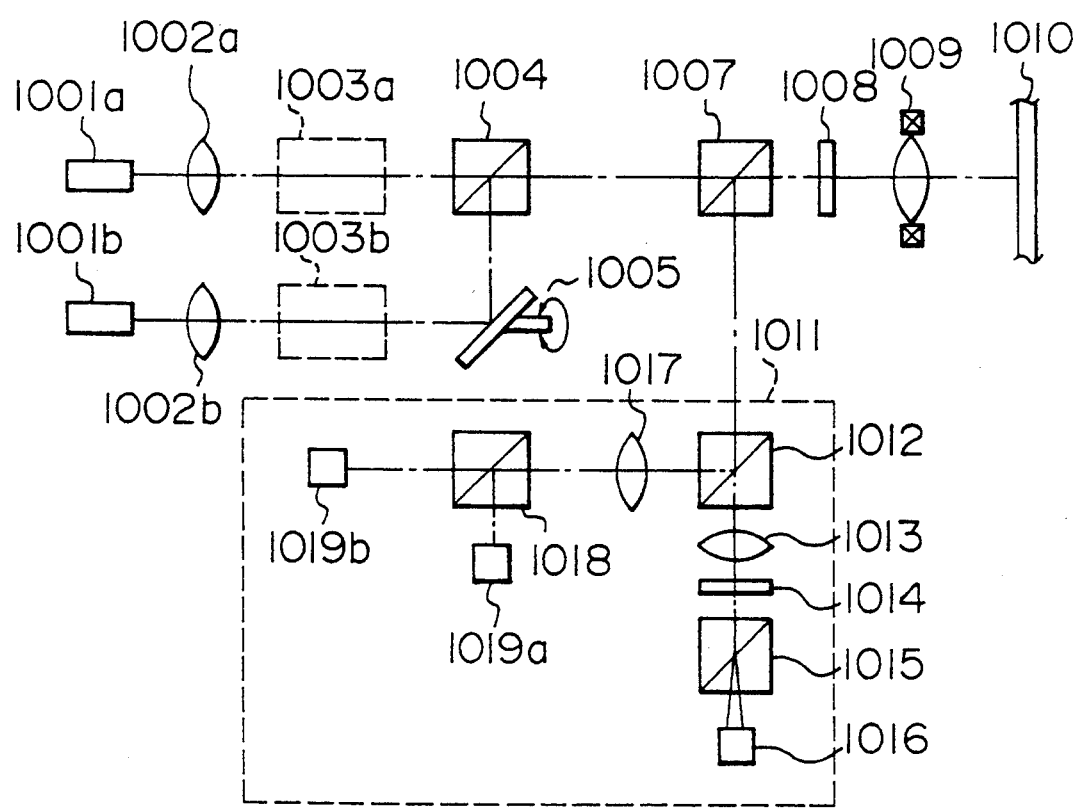
FIG. 13 is a block diagram showing another example of the optical head structure of an optical detector of the optical disk apparatus according to the present invention.

FIG. 13 shows another embodiment of the present invention. This embodiment deals with the case where the diffraction grating 1006 in FIG. 10 is not used. The component structure other than the optical detector 1016 is the same as that of FIG. 10 and is therefore omitted.

FIG. 14A shows the shape of the light reception surface of the optical detector 1016 in this embodiment. When the diffraction grating 1006 is not Used, the offtrack detection is carried out by the so-called "diffracted beam differential method". When the Galvano-mirror 1005 is moved so as to position two focused spots on the same track, there occurs the problem that the offset occurs in the offtrack detection signal because the luminous flux moves on the optical detector 1016. To solve this problem, a part of the optical detector is finely divided.

FIG. 14A shows one of the light reception surfaces 1016a of the optical detector 1016. Since the other light reception surface 1016b has the same structure as the light reception surface 1016a, its explanation will be omitted.

The light reception surface comprises portions Da, Db and finely divided light reception groups D1–Dn. The luminous flux S is positioned substantially to the center of the light reception surface, and the diffracted beam from the track and the light reception surface are arranged in the relation shown in the drawing. At this time, offset occurs in the diffracted beam differential signal due to the movement of the Galvano-mirror 1005 or due to the deviation of the detector resulting from the temperature change and vibration. Therefore, the signals DAa, DSb, DS1–DSn from each light reception surface are compared by the controller 1200 so as to detect the position of the center of the luminous flux and to decide the split position C of the light reception surface for obtaining the diffracted beam differential signals. When the split positions of the light reception surface are set to Dk and Dk+1 among the group of light reception surfaces D1 to Dn, the diffracted beam differential signals TRa and TRb are as follows:

TRa=DSa+(DS1+...DSk)

TRb=DSb+(DSk+1+...DSn)

The offtrack signal TR is as follows:

TR=TRa−TRb

A so-called "mirror portion" disposed between the address data and the data recording region in ISO standard disks, for example, is used for deciding the split position. The explanation given above deals with the case where the offtrack signal is detected from only one of the light reception surfaces of the optical detector 1016, but the offtrack signals can of course be detected from both of the two luminous fluxes split by the Wallaston prism 1016.

In the present invention, the track guide grooves are so disposed as to extend zigzag in the track direction. Therefore, when the optical spot scans on the mean center line of the track guide grooves, the reflected beam from the disk is intensity-modulated in the cycle which is an integer multiple of the track zigzag cycle. As already explained with reference to FIG. 2, the intensity of the reflected beam from the disk becomes maximal when the optical spot scans on the mean center line of the zigzag track grooves. Accordingly, the tracking control can be made by detecting only the intensity of the reflected beam from the disk.

In the structure shown in FIG. 13, for example, the tracking control of the beam emitted from the laser source 1001b can be carried out by the system which detects only the intensity of the reflected beam a,s described above. The optical spot control signal such as off-focus and offtrack for positioning the focusing lens 1009 to a predetermined position is detected by the use of the optical spot by the laser source 1001a to drive the focusing lens 1009. In this way, the focused spot SPa shown in FIG. 11 is positioned to the track center.

Furthermore, in order to position the spot SPb$_0$ by the beam emitted from the laser source 1001b on the same track as SPa, the Galvano-mirror 1005 is rotated so that the light power of the reflected beam from the optical spot SPb$_0$ becomes maximal as described above. In this case, one of the light reception surfaces (the surface which receives the reflected beam by the optical spot SPb$_0$) of the optical detector shown in FIG. 14A is used as a single light reception surface so that the full light power of the reflected beam from the optical spot SPb$_0$ can be received.

According to this structure, even when the Galvano-mirror 1005 is rotated, offset does not occur in tracking unless the luminous flux is deviated from the light reception surface. Accordingly, the adjustment range of the optical spot SPb$_0$ by the Galvano-mirror 1005 can be expanded, and this is advantageous at the time of the initial adjustment of the optical head.

Incidentally, the zigzag cycles of the tracks may be differentiated between the adjacent tracks in order to reliably and quickly carry out the positioning operation of a plurality of optical spots to the same track at the time of the initial adjustment of the optical head and during the normal operation of the apparatus. The number of tracks from which a plurality of optical spots are deviated can be detected by detecting the frequency by which the intensity of the reflected beam is modulated.

This embodiment is premised on the use of the opto-magnetic disk (note that a magnet for applying an external magnetic field is omitted), and takes the structure wherein the opto-magnetic signals are reproduced by the optical detector 1016. However, it is also possible to employ the structure wherein the opto-magnetic signals are reproduced by the optical detectors 1019a and 1019b. In such a case, the beam splitter 1018 may be set while rotated by about 49° round the axis of the incident beam, as a polarized beam splitter for splitting the p.s polarized beam, or the luminous flux may be allowed to be incident by rotating the direction of polarization by about 45° by the use of a λ/2 plate. The off-focus signal detection system can be a so-called "astigmatism system", besides the embodiment of the invention described above.

The system of the present invention may be adapted to disks other than the opto-magnetic disk, such as the phase-change type optical disk and the write-once type optical disk. In the case of the opto-magnetic disk, the effects explained with reference to FIG. 10 cannot be obtained unless the wavelength plate 1008 is used, but a system not using the wavelength plate 1008 can be accomplished if the output of the laser source 1001a is sufficiently high. When the disks other than the opto-magnetic disk such as the phase-change type disk and the write-once type disk are used, a ¼ wavelength plate may be used as the wavelength plate 1008. When a plurality of wavelengths are used, a mean value of a plurality of wavelengths or the wavelength of any one of the light sources is used as the reference wavelength of the ¼ wavelength plate.

Furthermore, though this embodiment detects various signals by the use of the reflected beam from the disk, a beam transmitted through the disk may also be used. In such a case, the signal detection optical system 1011 may be so disposed as to oppose the focusing lens 1009 while interposing the disk 1010 between them. As to the offtrack signal detection system, this embodiment has been explained with primary reference to the so-called "diffracted beam differential detection system", but the essence of the present invention is not at all lost even when the so-called "sample servo system" is employed.

The embodiment described above uses the wobbling tracks which are minutely displaced and provided in the track scanning direction and in the direction of depth, uses also the pit edge recording system effective for improving the linear direction recording density from the aspect of optical resolution, processes the reproduction pulse train from the front edge and the pulse train from the rear edge by the independent reproduction systems, respectively, and then synthesizes them again to the original data strings, and sets the PLL response frequency to the frequency which is higher than the wobbling frequency but is lower than the reproduction signal frequency. Therefore, the PLL circuit can follow the wobble fluctuation by the wobbling tracks, and recording/reproduction characteristics can be improved in addition to the improvement in the track following characteristics and focus following characteristics.

Since the minute displacement in the direction of depth is provided with opposite phases for each pair of adjacent tracks, the track pitch can be reduced much more greatly than in the prior art due to the reduction of thermal influences between the adjacent tracks. Furthermore, the influences on the data pits that have been the problem with the wobble system (the fluctuation of the edge positions resulting from the modulation of the pit length by the wobbling frequency, etc.) can be eliminated by setting the PLL response frequency to the frequency which is higher than the wobbling frequency but is lower than the reproduction signal frequency and allowing the PLL circuit to follow the wobble fluctuation resulting from the wobbling tracks, in addition to the independent reproduction system of the front and rear edges. Accordingly, the improvement in the optical spot following characteristics and the improvement in the recording density can be satisfied simultaneously.

Figure 15:
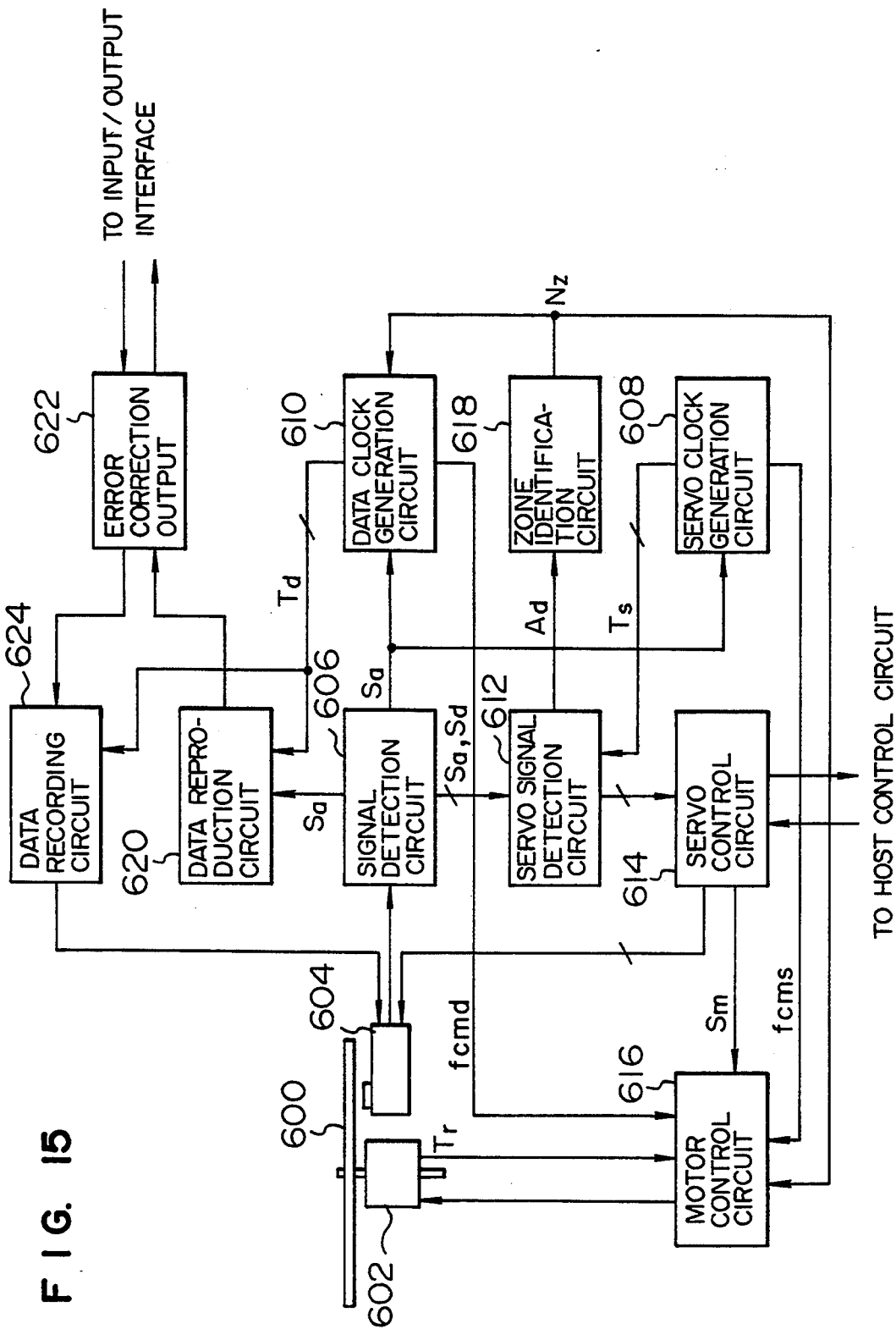
FIG. 15 is a block diagram showing the structure of an optical disk apparatus according to an embodiment of the present invention.

FIG. 15 is a block diagram showing the structure of the optical disk apparatus according to another embodiment of the present invention. Though this embodiment uses a phase-change medium as the recording medium for recording and reproducing data, the present invention is not particularly limited thereto.

In FIG. 15, the optical disk 600 is driven by a spindle motor 602. On this optical disk 600 are disposed means for generating clock pulses at each predetermined angle, such as clock marks, means for obtaining the offtrack signal by the use of the timing from the clock, such as wobble marks, and means for obtaining the data on the position of the optical spot or its moving distance by the use of the timing from the clock, such as access codes. The laser beam from the optical head 604 is focused onto the optical disk 600 and forms an optical spot. The reflected beam from the optical disk 600 is again guided into the optical head 604 and is converted to an electric signal by a detector. This electric signal is guided to a signal detection circuit 606, where a signal Sa representative of the total light power of the reflected beam and a signal Sd representative of the off-focus distance are generated.

When the optical spot passes on the clock mark, the reflected beam total light power signal Sa changes. This total light power signal Sa is guided to the servo clock generation circuit 608. The PLL in the servo clock generation circuit 608 generates a clock and a timing signal Ts for detecting a servo signal and a clock fcms for controlling the rotation of the spindle motor in synchronism with the clock mark. The total light power signal Sa is also guided to the data clock generation circuit 610. The PLL in the data clock generation circuit 610, too, generates the clock and timing signal Td for recording and reproducing the data and the clock fcmd for controlling the rotation of the spindle motor.

The total light power signal Sa and the signal Sd representing the off-focus distance generated by the signal detection circuit 606, and the servo signal detection clock and the timing signal Ts generated by the servo clock generation circuit 608 are applied to the servo signal detection circuit 612. The servo detection circuit 612 generates the offtrack signal, the off-focus signal, an address signal Ad representing the position of the optical spot, a signal representing the moving distance of the optical spot and a signal representing the moving speed of the optical spot from Sa and Sd on the basis of Ts. These signals are sent to the servo control circuit 614. The servo control circuit 614 generates driving signals for focusing, tracking and accessing by the use of the signals from the servo signal detection circuit 612 on the basis of the instruction from a host control circuit, and drives the mechanisms such as a focus actuator, a tracking actuator and an accessor. It sends an instruction Sm to the motor control circuit 616 on the basis of the instruction from the host control circuit, and starts and stops the spindle motor 602.

A zone identification circuit 618 identifies the zone in which the optical spot is positioned at present, from the address signal Ad from the servo signal detection circuit 612, generates a zone number Nz corresponding to this zone, and sends the zone number Nz to the data clock generation circuit 610 and to the motor control circuit 616. The motor control circuit 616 changes the dividing ratio of the clock to be used as a reference in accordance with the zone number Nz, and changes the rate of revolution of the motor by the clock obtained and the synchronizing clock fcms from the servo clock generation circuit 608 or the synchronizing clock fcmd from the data clock generation circuit 610. The data clock generation circuit 610 changes the frequency division ratio of the PLL on the basis of this division number Nz so that a data recording/reproducing clock having substantially a constant frequency and a timing signal Td can be obtained even when the rate of revolution changes.

The total light power signal Sa from the signal detection circuit 606 is inputted to the data reproduction circuit 620. Since this embodiment uses the phase-change medium, the data signal can be reproduced from the reflected beam total light power Sa. When the opto-magnetic medium is used, for example, the opto-magnetic signal is inputted to the data reproduction circuit 620 in place of the total light power signal Sa. The data reproduction circuit 612 extracts the data from the total light power signal by the use of the data recording/reproducing clock from the data clock generation circuit 610 and the timing signal Td, and effects demodulation on the basis of a demodulation rule. The demodulated data are sent to an error correction circuit 622, where the error correction of the data is carried out by the use of an ECC (Error Correction Code), for example. The error-corrected data are sent to a host apparatus through the input/output interface.

Conversely, when the data to be recorded are sent from the host apparatus through the input/output interface, the error correction circuit 122 adds the ECC for the error correction to the data and sends the data to the data recording circuit 624. The data recording circuit 624 modulates the data on the basis of the modulation rule, and the data are recorded on the optical disk 600 through the optical head 604 on the basis of the data recording/reproducing clock and the timing signal Td from the data clock generation circuit 610.

Figure 16A:
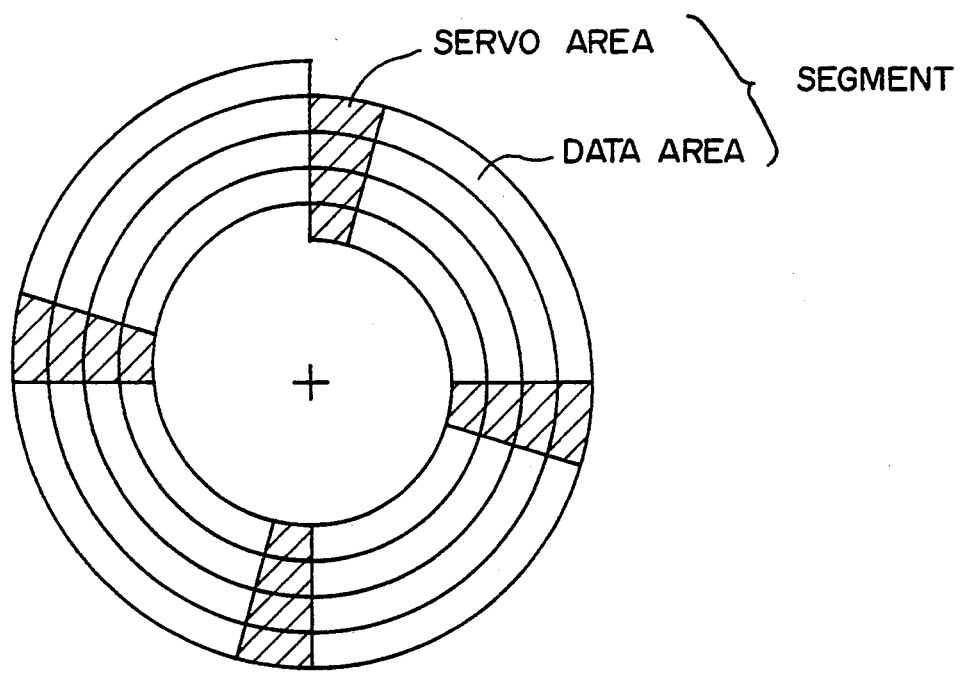
FIGS. 16A and 16B are enlarged views each showing a segment structure of the optical disk.
Figure 16B:
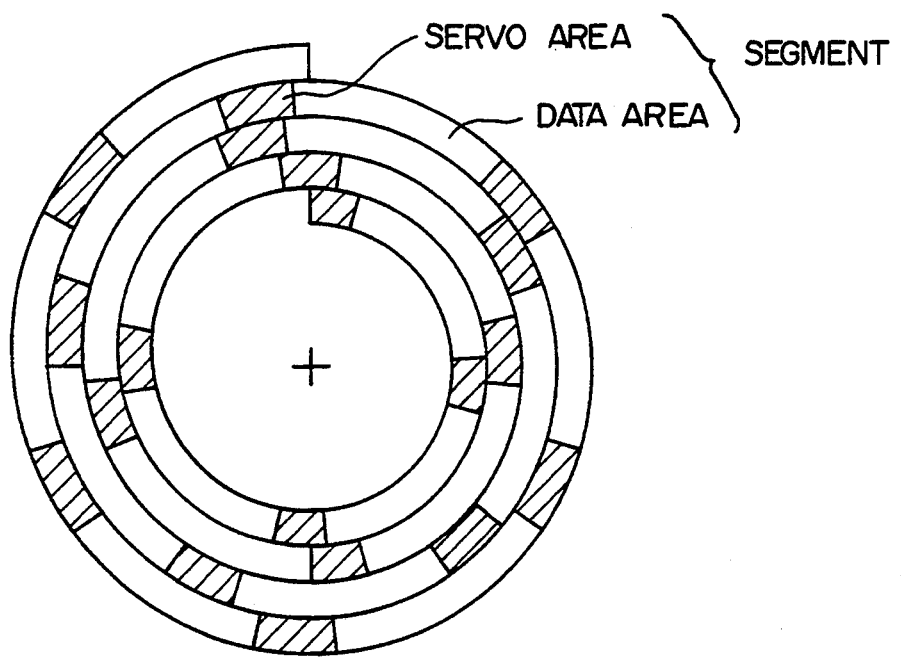

FIGS. 16A and 16B are enlarged views showing schematically a sample servo optical disk of the conventional CAV (Constant Angular Velocity) system and an optical disk of a CLV (Constant Linear Velocity) system employed for the sample servo optical disk, respectively. The segment as the minimum unit for recording and reproduction of the data is made up of a servo area in which servo data such as the clock mark, the wobble mark, access code, etc. are pre-formatted and a data area in which the data can be recorded, reproduced or erased. Though the actual segment is dozens of microns long, the segment is shown in enlargement for easy understanding.

In accordance with the sample servo of the CAV system shown in FIG. 16A, the length of the circumference becomes progressively greater towards the outer periphery side. Therefore, both of the servo area and data area become progressively greater towards the outer periphery side in proportion to the radius. The servo area and the data area are aligned linearly in the radial direction relative to the disk. Since this disk is rotated at a constant angular velocity, the time interval in which the servo area appears, or more particularly, the cycle in which the clock mark appears, is constant, and this cycle remains the same regardless of which track of the disk the head is positioned on. The sample servo synchronizes the PLL with the clock mark appearing in this predetermined cycle, generates various clocks or timing signals from this PLL and effects recording and reproduction of the data. Hereinafter, the mode in which the physical length increases in proportion to the radius, which provides the clock signals of a predetermined frequency when the disk is rotated at an equal angular velocity and in which the timing of recording and reproduction is established, will be referred to as a "CAV mode".

According to this system, however, the physical gap of the data pits becomes the shortest on the inner peripheral side and becomes progressively greater towards the outer peripheral side. If the pit gap on the outer periphery can be reduced, greater quantities of data can be recorded on the same disk. Furthermore, in accordance with the CAV system, the linear velocity is different between the inner and outer peripheral sides and hence, setting of the recording condition for recording the data is also different between the inner and outer peripheral sides. In other words, setting must be made precisely depending on the track position. A greater margin for obtaining an optimum recording state must be secured, and the condition imposed on the recording medium becomes more severe.

In contrast, the so-called "CLV (Constant Linear Velocity) system" is a system which changes the rate of revolution of the disk depending on the track position so that the linear velocity remains constant. This system is employed for a DAD (Digital Audio Disk), and so forth.

FIG. 16B shows an example in which the CLV system is used for the sample servo. The servo area and the data area have physically the same length irrespective of their positions. This system continuously packs these areas from the innermost or outermost peripheral side. Since this disk is rotated at a predetermined linear velocity, the time interval in which the servo area appears, or more particularly, the cycle in which the clock mark appears, is constant. Instead, since the linear velocity is kept constant, and the rate of revolution of the disk must be changed depending on the radial position of the head. In the sample servo, the PLL is synchronized with the clock mark appearing in the predetermined cycle, and recording and reproduction of the data are carried out by generating various clocks or timing signals from this PLL.

Hereinafter, the system in which the physical length remains equal irrespective of the radius, which provides a clock signal having a constant frequency when the disk is rotated at an equal linear velocity and which establishes the timing of recording and reproduction, will be referred to as the "CLV mode". When this system is employed, it is possible to reduce the servo area and the data area or, in other words, to make constant and minimize as much as possible the physical length of the data pits in the areas on all the tracks, and to increase the memory capacity.

However, a problem occurs when the CLV system is used for the sample servo. When the areas are continuously packed from the innermost periphery, for example, the length of the circumference becomes progressively greater towards the outer peripheral side. Therefore, the positions of the servo and data areas are not aligned linearly in the radial direction with respect to the disk as shown in FIG. 16B. Furthermore, the positions of the clock marks are deviated from one another between the adjacent tracks inside the servo areas.

When recording and reproduction are sequentially carried out along the tracks from the inner periphery to the outer periphery or vice versa, there occurs no problem because the clock marks appear equidistantly timewise. However, when the access operation in which the optical spot transversely crosses the track is carried out, the time interval in which the clock mark appears becomes irregular, and the synchronization of the PLL collapses. In the case of the sample servo, the moving distance and moving speed of the optical spot or the address of the track is detected by the use of the clocks or timing signals generated by the PLL. Accordingly, the access operation itself becomes impossible.

FIG. 17 shows a segment structure of an optical disk according to the present embodiment of the present invention. It is an enlarged view for ease of understanding in the same way as in FIGS. 16A and 16B, though the actual segment length is about several tens of μm. The servo area in which the servo data such as the clock mark, the wobble mark and the access code are pre-formatted is disposed in the same arrangement as that of the sample servo of the CAV system shown in FIG. 16A and is set to the CAV mode. In other words, the servo areas are aligned linearly in the radial direction with respect to the disk. The physical length of the servo area is proportional to the radius and becomes shorter on the inner peripheral side of the disk and, conversely, longer on the outer peripheral side.

In contrast, the data area for recording and reproducing the data is set to the CLV mode so that the number of data written on the inner peripheral side is small, and great on the outer peripheral side. The amount of data inside the data area is increased in units of one to several bytes. However, the increase of the circumference is not so great that the amount of data can be increased byte-by-byte by one for each adjacent track. Therefore, several tracks are put together into one zone, and the amount of data is increased whenever this zone changes. The division of the zones will be described later. The rate of revolution of the disk is changed for each zone, and is arranged to be greater in the zones on the outer peripheral side and smaller in the zones on the inner peripheral side so that the linear velocity becomes substantially constant. In other words, the operation mode is not the complete CLV mode but is the CLV mode adopting the zone division.

The servo areas are linearly aligned in the radial direction with respect to the disk. Therefore, when the access operation is carried out inside the same zone, the time interval in which the clock mark appears does not change, and the problem shown in FIG. 16B does not occur. When the access operation extending over the zones is carried out, however, the rate of revolution of the disk changes. However, this change of the rate of revolution results from the spindle motor having great inertia and from the disk, and the change of the interval in which the clock mark appears is sufficiently within the range of the following capacity of the PLL. In other words, when viewed from the PLL side, the interval in which the clock mark appears changes continuously. Therefore, no problem occurs even when the access operation extending over the zones is carried out.

Since the rate of revolution becomes smaller towards the zones on the outer peripheral side, the time interval in which the servo area appears, that is, the cycle in which the clock mark appears, becomes longer. The physical length of the servo area becomes greater, too, and along with it, the frequency of the servo clock for reading out the servo data becomes lower. In contrast, the physical length of the data area becomes longer towards the outer peripheral side. However, since the rate of data inside the data area increases with the increase of the physical length of the data area and the rate of revolution changes in such a manner as to make the linear velocity substantially constant, the data clock frequency for reading out the data becomes constant. Conversely, the data clock is generated with the clock mark inside the servo area being the reference, and the data clock must be a predetermined frequency although the frequency of the clock mark changes in accordance with the zones. The servo clock and data clock discussed here are generated by the servo clock generation circuit 608 and the data clock generation circuit 610 shown in FIG. 15, respectively. The details of these clock generation circuits will be described later.

FIG. 18 shows an example of the servo data structure inside the servo area of the optical disk according to the present invention shown in FIG. 17. As described previously, the servo area is written in the CAV mode, and the physical length becomes progressively greater on the outer peripheral side in proportion to the radius. A unique pattern represents that the clock mark appears next. In the sample servo, the detection of the servo signals and recording and reproduction of the data are all controlled by the clocks or timing signals generated by the PLL synchronized with this clock mark. The unique pattern is the first mark for activating the PLL, and must be detected even if the PLL is not locked. The unique pattern must be peculiar and does not appear in other portions as its name literally means, and is determined in practice in accordance with modulation/demodulation rules.

The wobble mark is used to obtain the offtrack signal, and generally comprises a set of two marks deviated mutually in the opposite directions from the track center. An AF mirror portion (Auto Focus mirror portion) does not have the marks or pits to detect the off-focus signal at this portion. The access code is used for detecting the moving distance or moving speed of the optical spot during the access operation, and a Gray code, for example, is used for this purpose.

Figure 19:
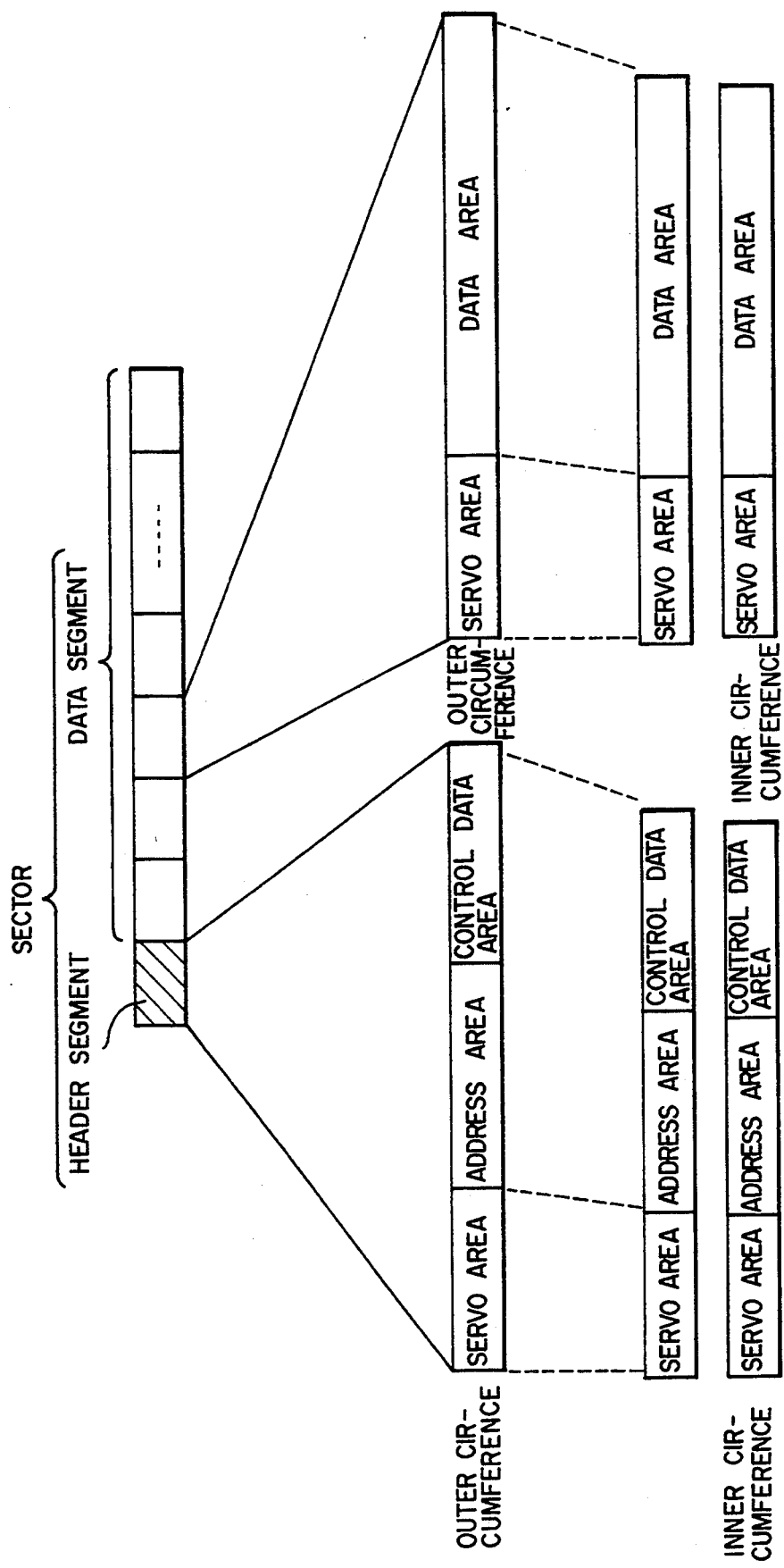
FIG. 19 is an explanatory view showing an example of a physical sector structure of an optical disk according to the present invention.

FIG. 19 shows an example of the physical sector structure of the optical disk in the present invention. The physical sector comprises a header segment in which the address data and control data of the physical sector are written, and a plurality of data segments capable of recording, reproducing or erasing the data. The data segment is shown in FIG. 17 and comprises the servo area and the data area. The header segment comprises the servo area, the address area and the control data area. The servo area is the same as the data segment. The track address at which the sector is positioned and the sector number are written in the address area. The use condition of the present or previous sector, existence of any defect, result of verify and the position of an alternate sector when the use is inhibited are written in the control data area with the data at the time of recording.

The servo area, the address area and the control data area inside the header segment and, furthermore, the servo area inside the data segment, are all written in the CAV mode. The data among them are read in accordance with the clocks and timing signals generated by the servo clock generation circuit 608 shown in FIG. 15. The servo clock generation circuit 608 keeps its operation even during the access operation as described above, so that the access operation becomes possible. As also described already, the data area inside the data segment are written in the CLV mode, and are read out by the clocks and timing signals generated by the data clock generation circuit 610 shown in FIG. 15. The servo area and the address area inside the header segment and the servo area inside the data segment are pre-formatted when the disk is produced.

Figure 20A:
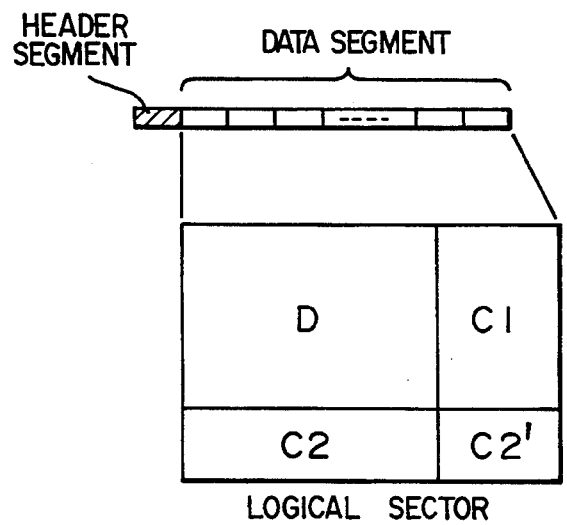
FIGS. 20A and 20B are explanatory views each showing the relation between a physical sector and a logical sector in an optical disk according to the present invention.
Figure 20B:
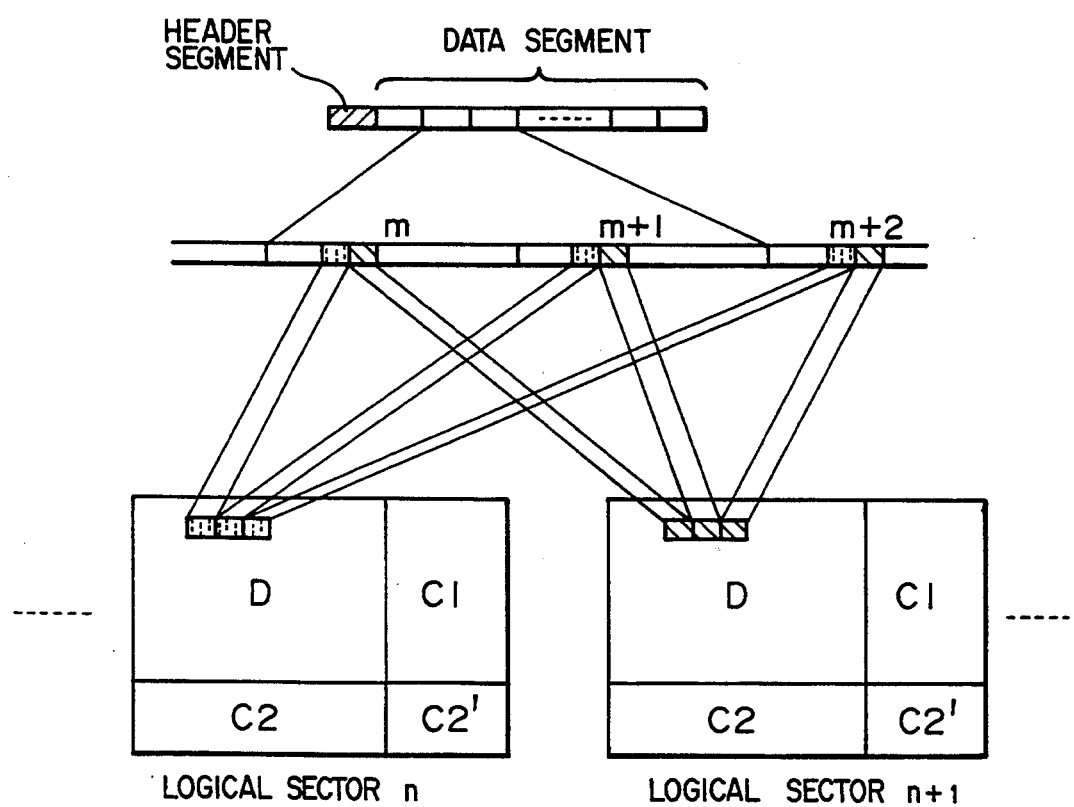

FIGS. 20A and 20B show the relation between the physical sector of the disk and the logical sector of the data shown in FIG. 19. The logical sector is the minimum unit of the data block when the data are handled.

FIG. 20A shows an example of the correspondence between the physical sector and the logical sector. Symbol D represents the data which are to be recorded and are arranged in a matrix. Symbol C1 represents the case where error correction codes are calculated in the direction of column D, that is, in the transverse direction, and the results are aligned in the direction of the column. Symbol C2 represents the case where the error correction codes are calculated in the direction of row D, that is, in the longitudinal direction, and the results aligned in the direction of row C2' represent the case where the error correction codes are calculated in the direction of row C1. The logical block represents the block of the data D to be recorded. The block of the logical sector which contains the error correction codes C1, C2 and C2' is allocated to one physical sector. For example, allocation is sequentially made to the data area of the data segment inside the physical sector from the upper left portion of the logical sector to the lower right portion.

However, the data quantity of the data area inside the data segment changes for each zone as described already. Therefore, to efficiently utilize the data, the data quantity inside the physical sector, too, is preferably changed for each zone. Then, the generation rule of the error correction codes must be changed for each zone. Another problem is that a higher-order OS, or the like, must cope with the change of the length of the logical sector.

FIG. 20B shows another example of the correspondence between the physical sector and the logical sector. For example, the block of the logical sector n including the error correction codes is segmented for each byte or several bytes and the resulting segments are allocated and dispersed to separate data segments such as the segments m, m+1 and m+2. Similarly, the block of the logical sector n+1 is segmented for each byte or several bytes and is dispersed to the segments m, m+1 and m+2. An exact integer number of logical sectors are dispersed in one track, and the number of bytes to be segmented is allowed to coincide with the change unit of the data quantity of the data segments when the zone changes. In this way, processing can be made extremely simple even when the zone changes, because only the number of logical sectors of one track changes.

Considering the case of 16 physical sectors/track, 84 data segments/sector, and 10 bytes/data segment in a certain zone, and the case where the logical sector has 512 bytes and 672 bytes inclusive of error correction codes, the block of the logical sector is segmented byte-by-byte is allocated to the data segment, and is dispersed for eight physical sectors and exactly the half of the circumference. The data of 20 logical sectors can be written per track. Assuming that the data quantity inside the data segment increases by one byte in the adjacent zones to 11 bytes/data segment, then, the increment of one logical sector occurs in the half of the circumference and the data of 22 logical sectors can be written per track. Under this state, 16 headers exist per track and the number of the clock marks of one circumference is 1,360.

Figure 21A:
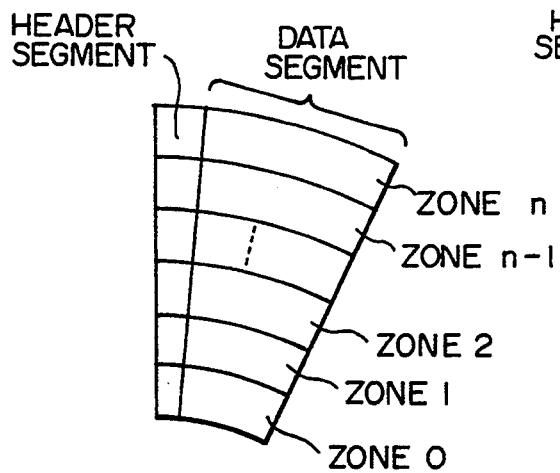
FIGS. 21A, 21B and 21C are explanatory views each showing an example of zone division of an optical disk according to the present invention.
Figure 21B:
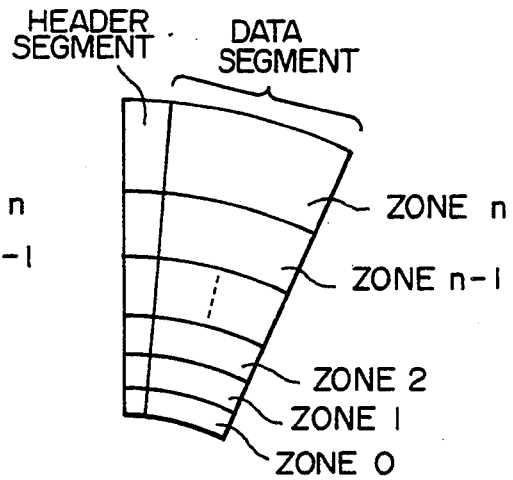
Figure 21C:
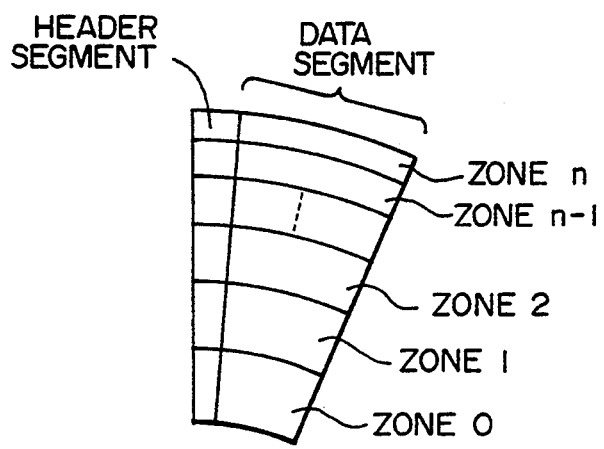

FIGS. 21A to 21C show examples of zone division, wherein the physical sectors are segmented in the radial direction.

FIG. 21A shows the case where the increment of data of the data segment per zone is constant. Since the increment of the circumference is in proportion to the increment of the radius, the zone, too, changes in proportion to the radius, and the number of tracks inside the zone is constant.

FIG. 21B shows the case where the range of the change of the linear velocity inside the zone is constant. The smaller the radius, the greater becomes the change of the linear velocity due to the change of the radius. Therefore, the smaller the radius, the smaller becomes the width of the zone.

FIG. 21C shows the case where the data quantity inside the zone is constant. Since the data quantity of one track increases towards the outer periphery, the width of the zone becomes smaller.

Figure 22:
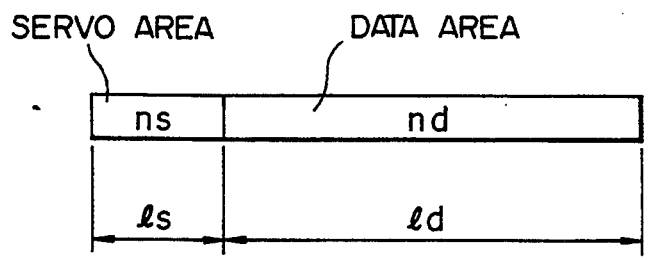
FIG. 22 is an explanatory view showing segments of an optical disk according to the present invention.

The oscillation frequency of each of the servo clock generation circuit 608 and the data clock generation circuit 610 shown in FIG. 15 will be explained with reference to FIG. 22. FIG. 22 shows the segment in the embodiment of the present invention, and is obtained by re-writing the header segment shown in FIG. 19 or the data segment shown in FIGS. 17 and 19. It will be assumed here that the lengths of the servo area and the data area are ls and ld, respectively, and the numbers of the data bytes in these areas are ns and nd, respectively.

The PLL inside the clock generation circuit operates in synchronism with the clock marks in the servo area. First, the servo clock relation will be considered. The byte clock fbs for each byte and the synchronizing clock fcms synchronized with the clock marks are expressed as follows, respectively:

$$fbs = v.ns/ls \quad (1)$$

$$fcms = v/(ls+ld) \quad (2)$$

where v is the linear velocity on the track. When v is eliminated from the equations, $$fcms.(ls+ld).ns = fbs.ls \quad (3)$$

Since the servo area is written in the CAV mode, the following relation can be established:

$$ls+ld:ls = n:ns \quad (4)$$

This represents the number of bytes when the data are written to all segments in the byte pitch of the servo area, that is, the total number of data bytes inside the segment in the CAV mode, where n is assumed to be an integer. The equation (3) is re-written using this equation as follows:

$$fbs = fcms.n \quad (5)$$

The frequency of the recording/reproduction clocks as the basis for reproducing or recording the data is determined depending on the modulation/demodulation rule. This embodiment uses an 8–10 modulation/demodulation rule in order to provide a DC-free property. In other words, the DC-free property is provided by adding two bits to one-byte or eight-bit data to obtain ten-bit data. This means that one-byte data is recorded and reproduced by ten clock pulses. When one-byte data is recorded and reproduced by c clock pulses, the reproducing clock frs for the servo can be expressed as follows using the equation (5):

$$\begin{aligned} frs &= fbs \cdot c \\ &= fcms \cdot n \cdot c \end{aligned} \quad (6)$$

This represents that the synchronizing clock fcms can be generated by oscillating frs by the PLL, frequency-dividing it by c to obtain the byte clock fbs and furthermore, frequency-dividing the byte clock fbs by n.

Next, the data clock relation will be considered. The clock fbd for each byte and the frequency of the clock fcmd synchronized with the clock mark are expressed as follows:

$$fbd = v.nd/ld \quad (7)$$

$$fcmd = v/(ls + ld) \quad (8)$$

where v is the linear velocity on the track. When v is eliminated from these equations, $$fcmd.(ls+ld).nd = fbd.ld \quad (9)$$

The data area is written in the CLV mode, and nd changes in each zone. The ratio of the lengths of the segment and data area is defined in the following way:

$$ls+ld:ls = x:y \quad (10)$$

where x and y are mutually prime numbers. When the equation (9) is rewritten using this equation, $$\begin{aligned} fbd \cdot y &= fcmd \cdot x \cdot nd \\ &= fosc \end{aligned} \quad (11)$$

where fosc is the oscillation frequency of the PLL.

This equation represents that the byte clock fbd can be generated by frequency-dividing the oscillation frequency by c and the synchronizing clock fcmd can be obtained by frequency-dividing fosc by x.nd. However, assuming that the one-byte data are recorded and reproduced according to the c clock pulses, the data recording/reproducing clock frwd must have the following relation:

$$frwd = fbd.c \quad (12)$$

It can be understood from equations (11) and (12) that y and c are preferably the same or divisors. Then, if setting is so made as to satisfy fosc=frwd, all the necessary clocks can be generated from frwd. If not, for example, when y and c are prime numbers to each other, the relation fosc'=fbd.c.y must be satisfied. In this case, fosc' becomes a considerably high frequency and the circuit scale of the frequency divider, etc., becomes great.

The detail of the servo clock generation circuit 608 and data clock generation circuit 610 shown in FIG. 15 on the basis of the frequency relationship described above is shown in FIG. 23.

Figure 23:
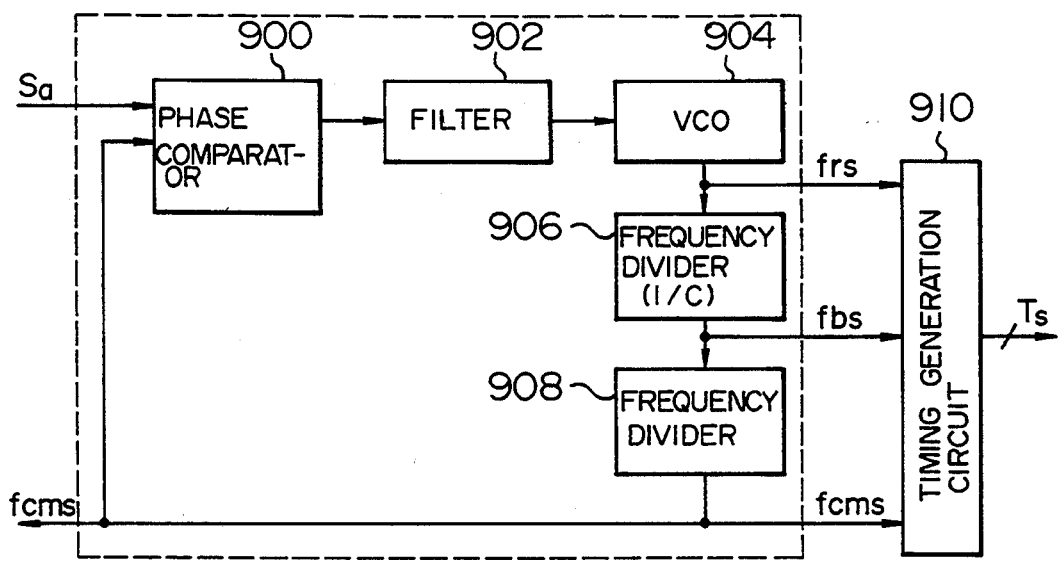
FIG. 23 is a block diagram showing in detail a servo clock generation circuit according to the present invention.

FIG. 23 shows in detail the servo clock generation circuit 608 shown in FIG. 15. The phase comparator 900 compares the phase difference of the clock mark signal contained in the total light power signal Sa and the synchronizing clock signal obtained by frequency-dividing the VCO (Voltage Control Oscillator) 904 and generates a voltage proportional to the phase difference. This phase difference voltage is phase-compensated by the filter 902 and becomes a driving voltage of the VCO 904. The VCO 904 oscillates the reproduction clock frs for servo. The frequency of this reproduction clock frs is divided into 1/c by the frequency divider 906 and becomes a byte clock fbs. Furthermore, the byte clock fbs is frequency-divided into 1/n by the frequency divider 908 and becomes a synchronizing clock fcms. The portion represented by dash lines in FIG. 23 is the portion which is previously referred to as "the "PLL for servo". This PLL forms a feedback loop, and so operates as to align the phase of the clock mark signal contained in the total light power signal Sa with the phase of the synchronizing clock signal fcms. The timing signal generation circuit 910 generates various clocks and timing signals Ts necessary for the reproduction of the servo signal from the reproduction clock frs, the byte clock fbs and the synchronizing clock fcms. The synchronizing clock signal fcms is also sent to the motor control circuit 616.

Figure 24:
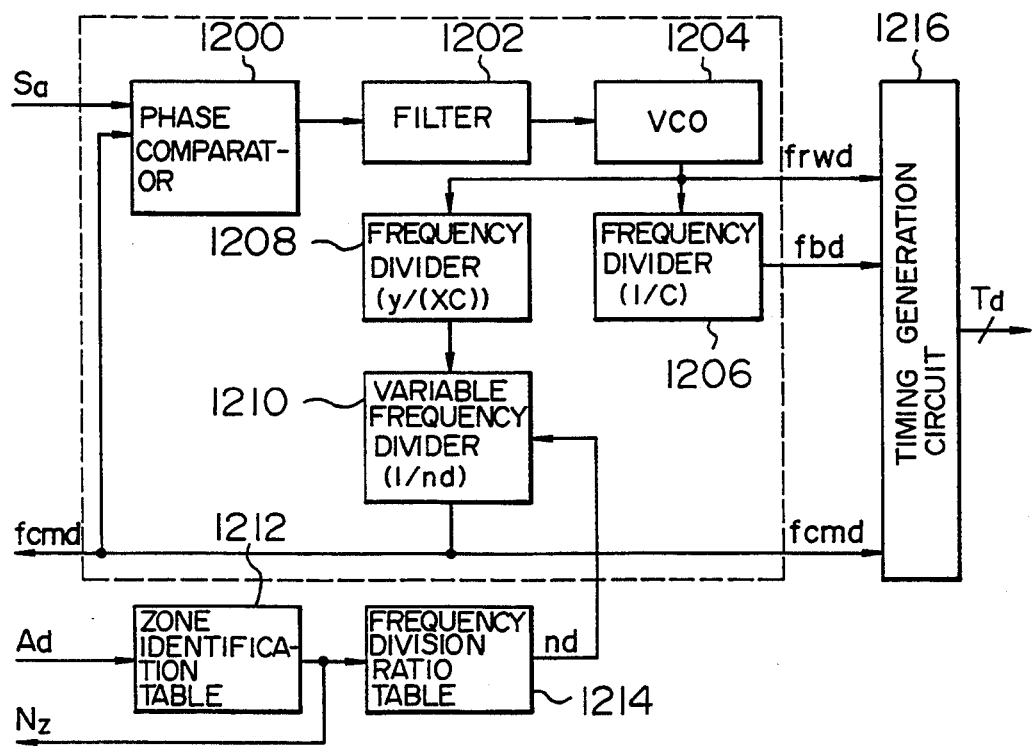
FIG. 24 is a block diagram showing in detail a data clock generation circuit according to the present invention.

FIG. 24 shows in detail the data clock generation circuit 610 and zone identification circuit 618 shown in FIG. 15. As to c and y shown in FIG. 8, however, the equation c=y is here assumed. The phase comparator 1200 compares the phase difference of the clock mark signal contained in the total light power signal Sa and the synchronizing clock signal fcmd obtained by frequency-dividing the VCO (Voltage Control Oscillator) 1204, and generates a voltage proportional to the phase difference. This phase difference voltage is phase-compensated by the filter 1002 and becomes a driving signal of the VCO 1204. The VCO 1204 oscillates a data recording/reproduction clock frwd. The data recording/reproduction clock frwd is frequency-divided into 1/c by the frequency divider 1206 and becomes the byte clock fbd. Furthermore, the recording/reproduction clock frwd is frequency-divided into y/(x.c) by the frequency divider 1208, is then frequency-divided into 1/nd by a variable frequency divider 1210 and becomes a synchronizing clock fcmd.

The zone identification table 1212 identifies the zone number Nz of the track from its address Ad and sends it to a frequency division ratio table 1214. The frequency division ratio table 1214 decides the frequency division ratio nd from the zone number Nz and sends it to the variable frequency divider 1010. The zone number Nz is also sent to the motor control circuit.

In FIG. 24, the portion indicated by dash lines is the portion which is previously referred to as the "PLL for data". This PLL forms a feedback loop, and so operates as to align the phase of the clock mark signal contained in the total light power signal Sa with that of the synchronizing clock signal fcmd. The timing signal generation circuit 1216 generates various clocks and timing signals Td from the reproduction clock frwd, the byte clock fbd and the synchronizing clock fcmd. The synchronizing clock signal fcmd is also sent to the motor control circuit 616.

Figure 25:
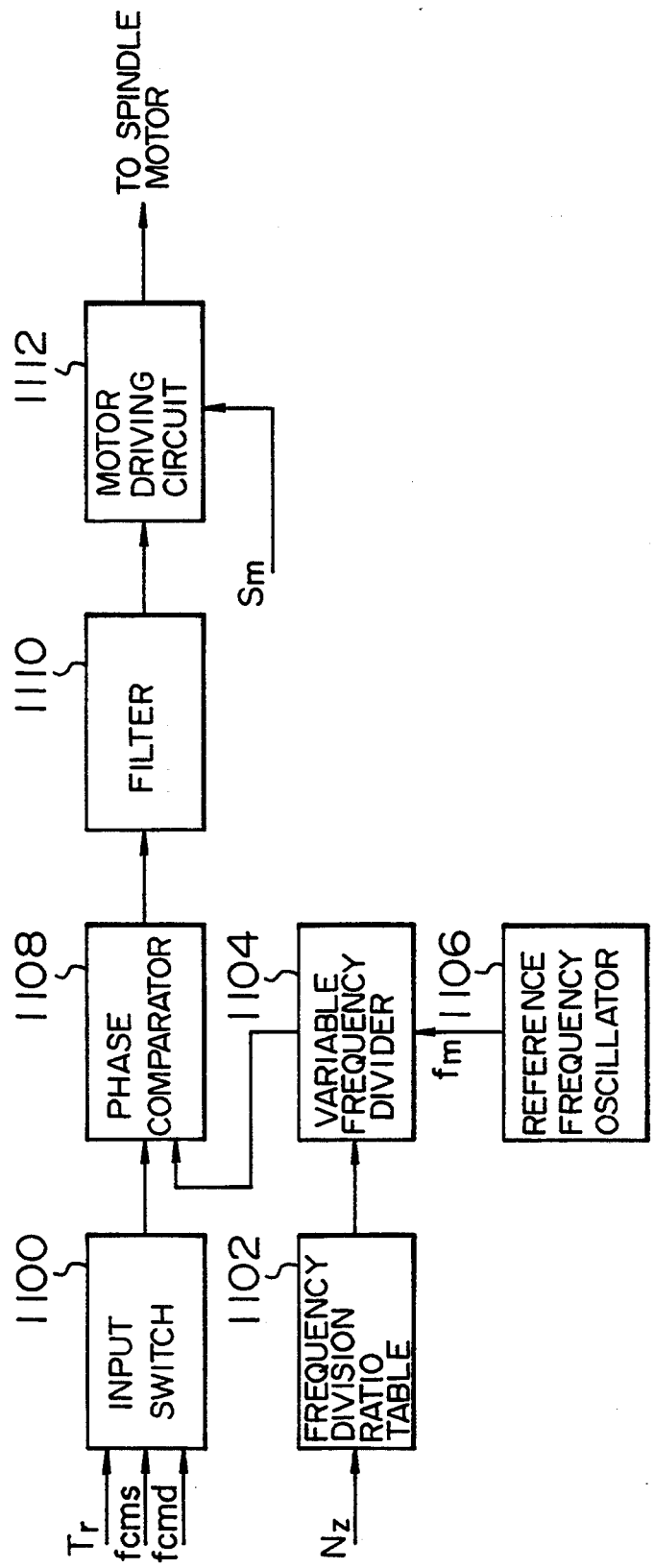
FIG. 25 is a block diagram showing in detail a motor control circuit according to the present invention.

FIG. 25 shows in detail the motor control circuit shown in FIG. 15. The rate-of-revolution signal Tr from the spindle motor 602 in FIG. 15, the synchronizing clock signal fcms from the servo clock generation circuit 608 and the synchronizing signal clock signal fcmd from the data clock generation circuit 610 are inputted to the input switch 1100. The frequency division ratio table 1102 decides the frequency division ratio nm from the zone number Nz and sends it to the variable frequency divider 1104. The variable frequency divider 1104 divides the frequency of the signal from the reference frequency oscillator 1106 into 1/nm and sends it to the phase comparator 1108. The phase comparator 1108 compares the phase difference between this signal and the signal selected by the input switch 1100 and generates a voltage proportional to the phase difference. This phase difference voltage is phase-compensated by the filter 1110 and drives the spindle motor 602 through the motor driving circuit 1112. The motor driving circuit 1112 starts and stops the spindle motor 602 on the basis of the instruction from the servo control circuit 614.

The motor control circuit shown in FIG. 25 operates in such a fashion that the frequency obtained by dividing the reference frequency coincides with the rate-of-revolution signal Tr or the synchronizing clock signal fcmd or fcms. The rate of revolution can be set to a predetermined value for each zone by changing the frequency division ratio nm of the variable frequency divider 1104 in accordance with the zone.

The operations of the input switch 1100 are as follows. First of all, it rotates the spindle motor 602 using the rate-of-revolution signal Tr from the spindle motor 602 as a reference at the time of actuation. When the servo PLL inside the servo clock generation circuit 608 starts operating, the input switch 1100 switches the reference signal to the synchronizing clock signal fcms from the circuit 608, and furthermore, when the data PLL inside the data clock generation circuit 610 starts operating, it switches the reference signal to the synchronizing clock signal fcmd from the circuit 610. Accordingly, accurate rotation can be obtained during recording and reproduction with the data PLL being the reference.

When an access is made to another zone, the frequency division ratio inside the data PLL changes; thence, the synchronizing clock fcmd often disappears or becomes unstable. Therefore, the reference is switched to the synchronizing clock fcms from the servo PLL during the access and is returned to the original reference after the access is completed. The frequency division ratio of the frequency divider 104 changes during the access to other zones, and the rate of revolution of the spindle motor changes, too.

The following table illustrates an example of the relationship of frequency of the clocks or timing signals in the present invention.

It will be assumed that the disk diameter is 2.5 inch and recording/reproduction is carried out from a diameter of 32 mm to 62.5 mm. The 8–10 modulation/demodulation rule is used, and the condition of 16 sectors/track, 85 segments inclusive of the header segment per sector, and the data quantity inside one segment of 10 bytes in the innermost peripheral zone and increasing by 2 bytes whenever the zone changes is chosen. According to the symbols used in this embodiment, x is 6, y is 5, c is 10, n is 12, and nd and nm increase two by two from 10.

When the disk rotates at 4,800 rpm in the innermost peripheral zone, the sampling gap fcm of the synchronizing clock, that is, the clock mark, changes between about 108.8 MHz and 60.4 MHz depending on the zones. However, fcms and fcmd are together written as fcm. As the zone changes, the original oscillation frequency frs of the servo PLL changes, but since the frequency division ratio nd also changes, the oscillation frequency of the data PLL becomes constant. The spindle motor control system is arranged so that the frequency division ratio nm changes at a constant reference frequency fm, the rate of revolution of the disk is controlled for each zone, and a substantially constant linear speed is attained.

According to the optical disk apparatus of this embodiment, a greater quantity of data can be recorded in the optical disk apparatus using the sample servo than in the CAV system, and the burden on the recording/reproduction system can be reduced. Furthermore, a medium having a small recording power margin can be used.

It is possible to use a recording medium having wobbling tracks as the recording medium of the optical disk apparatus of this embodiment and to conduct pit edge recording on this recording medium as has already been explained with reference to FIGS. 1 to 14. In this case, however, it is preferable to generate at least the reproduction clock by a self-clock system which generates the clock signals for reproduction (demodulation) from the edge data or center position data of the recorded pit, but not by the sample clock (servo) system, in order to absorb the edge shift.

We claim:

1. A data recording/reproduction method comprising the steps of:
recording arbitrary user data on a recording medium having track guide grooves disposed thereon in a track scanning direction and displaced at a predetermined wobbling frequency to form a plurality of recorded regions in such a manner that a specific code word contained in said arbitrary user data is recorded at the front or rear edge portion of each of said recorded regions;
recording predetermined known data on said recording medium to form further recorded regions in such a manner that said specific code word is recorded at the front and rear edge portions of each of said further recorded regions so as to represent said predetermined known data; and
reproducing at least a part of said arbitrary user data and said predetermined known data.

TABLE

| Zone | Synchronizing clock fcm (KHz) | Servo PLL frs (MHz) | Data PLL | | Motor control system | | | Diameter (mm) | Linear velocity (m/s) |
|---|---|---|---|---|---|---|---|---|---|
| | | | frwd (MHz) | nd | fm (MHz) | nm | No.-of-revolution (rpm) | | |
| 0 | 108.8 | 13.056 | 13.056 | 10 | 1.088 | 10 | 4800 | 32.0–38.4 | 8.0–9.7 |
| 1 | 90.7 | 10.880 | 13.056 | 12 | 1.088 | 12 | 4000 | 38.4–44.8 | 8.0–9.4 |
| 2 | 77.7 | 9.326 | 13.056 | 14 | 1.088 | 14 | 3429 | 44.8–51.2 | 8.0–9.2 |
| 3 | 68.0 | 8.160 | 13.056 | 16 | 1.088 | 16 | 3000 | 51.2–57.6 | 8.0–8.9 |
| 4 | 60.4 | 7.25 | 13.056 | 18 | 1.088 | 18 | 2667 | 57.6–62.5 | 8.0–8.7 |

2. A data recording/reproduction method according to claim 1, wherein said reproduction step detects edge data corresponding to the front and rear edge portions of said recorded region, stores the edge data in memory means, and thereafter reconstructs said arbitrary user data from said edge data stored in said memory means on the basis of said positional relationship representative of said predetermined known data.

3. A data recording/reproduction method according to claim 1, wherein said data recording medium is an optical disk medium.

4. A data recording/reproduction method according to claim 3, wherein a plurality of optical spots are arranged on said optical disk medium and said data are recorded and reproduced.

5. A data recording/reproduction method according to claim 3, wherein two optical spots are arranged on the same track of said optical disk medium, recording of said data is effected by a preceding optical spot and reproduction of said data is effected by a subsequent optical spot.

6. A data recording/reproduction method according to claim 1, wherein said wobbling frequency of said track guide groove in the track scanning direction is set to be higher than a control frequency band of optical spot control.

7. A data recording/reproduction method according to claim 1, wherein said wobbling frequency of said track guide groove in the track scanning direction is set to be lower than a reproduction signal frequency of said recorded data.

8. A data recording/reproduction method according to claim 1, wherein each of said tracks on said recording medium is divided into a plurality of zones and has a clock mark for generating a clock for every predetermined rate of revolution, and which further includes the following steps before each of said recording step of said arbitrary user data, said recording step of said predetermined known data and said reproduction step:
    identifying a zone for which recording/reproduction of data is to be carried out; and
    setting a rate of revolution of said recording medium to a rate of revolution corresponding to said zone identified.

9. A data recording/reproduction method according to claim 8, wherein recording of said arbitrary user data, recording of said predetermined known data and reproduction of said arbitrary user data and said predetermined known data are carried out by the use of clocks generated in synchronism with said clock marks.

10. A data recording/reproduction apparatus comprising:
    a recording medium having track guide grooves wobbled in a track scanning direction at a predetermined wobbling frequency;
    a light source;
    means for irradiating an optical beam emitted from said light source to said recording medium;
    means for recording arbitrary user data by forming, on said recording medium with said optical beam, recorded regions in such a manner that a specific code word contained in said arbitrary user data is recorded at respective ones of rear and front edges of each of said recorded regions and also to record predetermined known data by forming, on said recording medium, further recorded regions in such a manner that said specific code word is recorded at front and rear edges of each of said further recorded regions so as to represent said predetermined known data;
    means for reproducing said arbitrary user data from reflected beams or transmitted beams of said recording medium;
    means for detecting offtrack from said reflected beams or transmitted beams; and
    means for correcting offtrack from said offtrack detected by said offtrack detection means.

11. A data recording/reproduction apparatus according to claim 10, wherein said recording means includes means for detecting independently edge data corresponding to said front edge portion and said rear edge portion of said recorded region from said reflected beams or said transmitted beams and storing the edge data, respectively, and means for reconstructing said arbitrary user data from said edge data stored in said memory means on the basis of said positional relationship representative of said predetermined known data.

12. A data recording/reproduction apparatus according to claim 10, wherein said data recording medium is an optical disk medium.

13. A data recording/reproduction apparatus according to claim 10, wherein said irradiating means irradiates said optical beam as a plurality of optical spots on said recording medium.

14. A data recording/reproduction apparatus according to claim 13, wherein the predetermined wobbling frequency of said track guide groove in said scanning direction on said recording medium is higher than a position control frequency band of said optical spots irradiated on said recording medium.

15. A data recording/reproduction apparatus according to claim 13, wherein said irradiating means irradiates a plurality of said optical beams on the same track of said recording medium, recording of data is effected by a preceding one of said optical beams and reproduction of said recorded data is effected by a subsequent one of said optical beams.

16. A data recording/reproduction apparatus according to claim 10, wherein said predetermined wobbling frequency is higher than a control frequency band of optical spot position control.

17. A data recording/reproduction apparatus according to claim 10, wherein said predetermined wobbling frequency is lower than a reproduction signal frequency of said recorded data.

18. A data recording/reproduction apparatus according to claim 10, further comprising:
    first and second reproduction clock generation means for generating mutually independent first and second reproduction clock trains synchronized with said edge data corresponding to said front edge portion and with said edge data corresponding to said rear edge portion, and generating first and second reproduction pulse trains synchronized mutually independently with said first and second clock trains, respectively; and
    means for controlling storage positions of said memory means, when said first and second reproduction pulse trains are stored in said memory means, in such a manner that distance or a positional relationship between said reproduction pulse trains obtained from said front edge portion and said rear edge portion of said further recorded region coincides with distance or a positional relationship between said front edge portion and said rear edge portion representative of said predetermined known data, respectively, and thus controlling the storage of said first and second reproduction pulse trains; and wherein when said reproduction data are read out from said memory means, either one of said first and second reproduction clock trains, or other arbitrary clock, is employed.

19. A data recording/reproduction apparatus according to claim 18, wherein each of said first and second clock generation means includes means for detecting a phase difference between said edge data and said reproduction clock and correcting said phase difference, and a phase correction following operation frequency band of said first and second reproduction clock generation means is set above a control frequency band for optical spot position control and below a frequency band of a data bit or a data reproduction signal.

20. A data recording/reproduction apparatus according to claim 10, wherein said irradiating means irradiates said optical beam as a plurality of optical beams having different wavelengths.

21. A data recording/reproduction apparatus according to claim 10, wherein said recording medium is a recording medium, each track of which is divided into a plurality of zones, and which further comprises means for setting a rate of revolution of said recording medium to a rate of revolution corresponding to said zones.

22. An optical data recording/reproduction method for a recording medium, each track of which is divided into a plurality of zones, and each track having a clock mark for generating a clock for every angle of rotation of said recording medium, comprising the steps of:

identifying said zones for recording/reproducing data;

setting a rate of revolution of said recording medium to a rate of revolution corresponding to said zone identified; and effecting recording/reproduction of data to and from said recording medium by the use of said clock generated in synchronism with said clock mark.

23. An optical data recording/reproduction method according to claim 22 wherein the rate of revolution of said recording medium is changed on the basis of an interval in which said clock marks appear.

24. An optical data recording/reproduction method according to claim 22, wherein the rate of revolution is changed in such a manner that a linear velocity of said recording medium becomes substantially constant for each of said zones.

25. An optical data recording/reproduction method according to claim 24, wherein said zone is divided in such a manner that the change of the linear velocity inside said zone becomes constant.

26. An optical data recording/reproduction method according to claim 22, wherein reproduction of servo data is effected on the basis of a clock and a timing signal from a servo clock generation circuit in synchronism with said clock marks, and recording/reproduction of data is effected on the basis of a clock and a timing signal from a data clock generation circuit in synchronism with said clock marks.

27. An optical data recording/reproduction method according to claim 26, wherein said clock from said servo clock generation circuit generates clocks obtained by dividing a time interval, in which said clock marks appear, by a constant for all of said zones.

28. An optical data recording/reproduction method according to claim 27, wherein said servo clock generation circuit comprises a PLL having a fixed frequency division ratio and a timing generation circuit for generating a timing for reproducing servo data from a signal of said PLL.

29. An optical data recording/reproduction method according to claim 26, wherein a moving distance and a moving speed of an optical spot are detected on the basis of said clock and said timing signal from said servo clock generation circuit during an access operation for positioning said optical spot to a target track.

30. An optical data recording/reproduction method according to claim 26, wherein focusing of said optical spot is effected on the basis of said clock and said timing signal from said servo clock generation circuit during an access operation for positioning said optical spot to a target track.

31. An optical data recording/reproduction method according to claim 26, wherein said clocks from said data clock generation circuit have a predetermined frequency throughout all of said zones.

32. An optical data recording/reproduction method according to claim 26, wherein said data clock generation circuit comprises a PLL capable of changing a frequency division ratio and a timing generation circuit for generating a timing for recording/reproducing data from a signal of said PLL, and changes the frequency division ratio of said PLL in accordance with a zone.

33. An optical data recording/reproduction method according to claim 22, wherein servo areas each containing a clock pit and servo data and data areas for recording and reproducing data are aligned alternately on each of said tracks on said recording medium, and said servo areas and said data areas are arranged linearly in a radial direction of said recording medium, respectively.

34. An optical data recording/reproduction method according to claim 33, wherein a data quantity in each of said data areas is constant.

35. An optical data recording/reproduction method according to claim 33, wherein said zone is divided in such a manner that the length of said data area in the innermost peripheral track inside said zone increases by a predetermined length.

36. An optical data recording/reproduction method according to claim 33, wherein when a minimum integral ratio of the sum of the length of said servo area and said data area to the length of said data area is x:y and the number of clocks necessary for recording or reproducing one-byte data is c, x is a divisor of c.

37. An optical data recording/reproduction method according to claim 22, wherein said zone is divided in such a manner that the quantity of data capable of being recorded and reproduced inside said zone becomes constant.

38. An optical data recording/reproduction method according to claim 22, wherein said recording medium is a phase-change medium.

* * * * *